(12) United States Patent
Morita et al.

(10) Patent No.: US 10,382,972 B2
(45) Date of Patent: Aug. 13, 2019

(54) COVERAGE CONTROL METHOD, BASE STATION APPARATUS, WIRELESS COMMUNICATION SYSTEM, AND NON-TRANSITORY COMPUTER READABLE MEDIUM HAVING BASE STATION CONTROL PROGRAM STORED THEREON

(71) Applicant: NEC Corporation, Minato-ku, Tokyo (JP)

(72) Inventors: Motoki Morita, Tokyo (JP); Daisuke Matsuo, Tokyo (JP); Takahiro Nobukiyo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 17 days.

(21) Appl. No.: 15/554,638

(22) PCT Filed: Jan. 12, 2016

(86) PCT No.: PCT/JP2016/000108
§ 371 (c)(1),
(2) Date: Aug. 30, 2017

(87) PCT Pub. No.: WO2016/143238
PCT Pub. Date: Sep. 15, 2016

(65) Prior Publication Data
US 2018/0242160 A1     Aug. 23, 2018

(30) Foreign Application Priority Data

Mar. 6, 2015    (JP) .................................. 2015-044829

(51) Int. Cl.
*H04W 36/00* (2009.01)
*H04W 16/32* (2009.01)
(Continued)

(52) U.S. Cl.
CPC ........... *H04W 16/08* (2013.01); *H04W 16/28* (2013.01); *H04W 36/00* (2013.01); *H04W 36/22* (2013.01); *H04W 84/045* (2013.01)

(58) Field of Classification Search
CPC ...... H04W 16/08; H04W 36/22; H04W 16/24
(Continued)

(56) References Cited

U.S. PATENT DOCUMENTS

2002/0034967 A1    3/2002   Taniguchi et al.
2010/0027507 A1*   2/2010   Li ..................... H04W 36/0055
                                                                    370/331
(Continued)

FOREIGN PATENT DOCUMENTS

JP    2002-94448 A    3/2002
JP    2012-54736 A    3/2012
(Continued)

OTHER PUBLICATIONS

Satoshi Konishi, Toshiaki Yamamoto, "LTE/LTE-Advanced System no Tameno Self-Organizing Networks (SON) Gijutsu ni yoru Jido Saitekika no Koka",The Transactions of the Institute of Electronics, Information and Communication Engineers B, (Aug. 1, 2014), vol. J97-B, No. 8, pp. 599 to 610.
(Continued)

Primary Examiner — Asad M Nawaz
Assistant Examiner — Jason A Harley

(57) ABSTRACT

The coverage control method includes at least: step S101 of detecting that a load of an own cell is higher than a predetermined threshold (Lth1) when there is another cell whose coverage partially overlaps the own cell; step S103 of selecting an accommodation candidate cell that is a candidate to which a mobile station accommodated in the cell is unloaded, from the another cell based on a load condition related to a communication load that is a coverage control
(Continued)

execution target; step S106 of selecting a continuously accommodated mobile station that is a mobile station that continues to be a coverage control target of the own cell, from the mobile station accommodated in the own cell based on radio quality of the selected accommodation candidate cell; and step S107 of controlling a coverage of the own cell by targeting at the selected continuously selected mobile station.

8 Claims, 9 Drawing Sheets

(51) Int. Cl.
*H04W 28/08* (2009.01)
*H04W 36/04* (2009.01)
*H04W 16/08* (2009.01)
*H04W 16/28* (2009.01)
*H04W 36/22* (2009.01)
*H04W 84/04* (2009.01)

(58) Field of Classification Search
USPC .......................................... 370/332; 455/446
See application file for complete search history.

(56) References Cited

U.S. PATENT DOCUMENTS

| 2015/0063098 A1* | 3/2015 | Yavuz | H04W 24/02 370/229 |
| 2015/0264579 A1* | 9/2015 | Claussen | H04W 16/28 455/452.1 |
| 2016/0174125 A1 | 6/2016 | Kobayashi et al. | |

FOREIGN PATENT DOCUMENTS

| WO | 00/72618 A1 | 11/2000 |
| WO | 2015/022952 A1 | 2/2015 |

OTHER PUBLICATIONS

International Search Report for PCT Application No. PCT/JP2016/000108, dated Mar. 15, 2016.

* cited by examiner

COVERAGE CONTROL METHOD, BASE STATION APPARATUS, WIRELESS COMMUNICATION SYSTEM, AND NON-TRANSITORY COMPUTER READABLE MEDIUM HAVING BASE STATION CONTROL PROGRAM STORED THEREON

This application is a National Stage Entry of PCT/JP2016/000108 filed on Jan. 12, 2016, which claims priority from Japanese Patent Application 2015-044829filed on Mar, 6, 2015, the contents of all which are incorporated herein by reference, in their entirety.

TECHNICAL FIELD

The present invention relates to a coverage control method, a base station apparatus, a wireless communication system and a base station control program.

More particularly, the present invention relates to the coverage control method, the base station apparatus, the wireless communication system and the base station control program which adjust a cover area of a beam transmitted from the base station apparatus. That is, the present invention relates to the coverage control method which is carried out for a continuously accommodated mobile station (a mobile station which continues to be accommodated in a current cell) selected based on radio quality of neighboring accommodation candidate cells whose coverages partially overlap, a base station apparatus, a wireless communication system and a base station control program.

BACKGROUND ART

In recent years, the spread of smartphones and tablet terminals and transmission and reception of large volume data such as moving images have been remarkably increasing data traffic of mobile communication. A promising measure for handling the increase in traffic is a base station installation method for locally installing base stations (referred to as "macro base stations" below) which cover wide ranges by using high transmission power and, in addition, multiple small cell base stations (referred to as "small cell base stations" below) which cover narrow ranges by using low transmission power, and thereby effectively increases a communication capacity. In this regard, the small cell base stations generally include pico base stations which it is assumed will be installed at hot spots at which users concentrate, and femtocell base stations which it is assumed will be installed at indoor places in which radio quality is bad. In addition, an area which enables communication with base stations is referred to as a cell.

By the way, urban areas in particular have difficulty in securing places to install base stations. Further, places at which the users concentrate also fluctuate depending on a date and a time. Under such a situation, installing multiple small cell base stations and making a small cell density higher are likely to cause a remarkable unbalance between the number of users to be accommodated and loads of small cells. As a result, there is a concern that a user throughput will be lowered in a small cell in which loads concentrate and user experience quality will be undermined.

Hence, a method for controlling coverages corresponding to small cell area sizes by adjusting transmission power of a small cell base station or directivity (tilt angle) in a vertical direction of an antenna to correct an unbalance between loads of small cells is generally employed. According to, for example, a method disclosed in International Patent Publication No. WO 2000/072618 of Patent Literature, "A METHOD FOR CELL LOAD SHARING IN A CELLULAR MOBILE RADIO COMMUNICATIONS SYSTEM", each cell measures a traffic load of each cell (own cell), and selects a cell which largely overlaps the own cell from surrounding cells of low traffic loads when a measurement result indicates a high load. Further, an offset parameter of a signal strength which is a coverage criterion is adjusted for the selected surrounding cells and own cell to enlarge effective coverages of the selected surrounding cells in a direction of the own cell and reduce an effective coverage of the own cell in a corresponding direction.

By contrast with this, when the measurement result indicates a low load, the effective coverages of the surrounding cells are reduced, and the effective coverage of the own cell is enlarged in the corresponding direction. The above control is performed to hand over some of connected mobile stations between the cells and balance the traffic loads.

Further, it is also possible to perform coverage control by targeting at a specific mobile station. For example, a method disclosed in Japanese Unexamined Patent Application Publication No. 2002-94448 of Patent Literature, "METHOD AND APPARATUS FOR CONTROLLING DIRECTIONAL ANTENNA", divides an area into a plurality of blocks, regards mobile stations belonging to the same block and located nearby as one group based on relative positions between a base station and mobile stations calculated based on GPS (Global Positioning System) position information, and controls a direction and a width (radiation angle) of a beam radiated from an adaptive array antenna in group units to capture one group by one beam. Such control is performed to share beams based on areas in which mobile stations locate and balance a traffic load.

CITATION LIST

Patent Literature

PTL 1: International Patent Publication No. WO 2000/072618 (pages 15 to 17)
PTL 2: Japanese Unexamined Patent Application Publication No. 2002-94448 (pages 4 to 6)

SUMMARY OF INVENTION

Technical Problem

With the conventional techniques of Patent Literature 1 and Patent Literature 2 which are techniques for controlling a cell range, i.e., a coverage of a base station, it is difficult to correct an unbalance between traffic loads of specific cells while securing radio quality of mobile stations. Hence, there is a problem that it is not possible to sufficiently improve a user throughput which has been lowered due to concentration of traffic loads.

That is, according to, for example, the technique disclosed in Patent Literature 1, received power from each base station does not change. Therefore, a mobile station handed over from one base station to another base station receives a significant interference signal from a handover source base station compared to a desired signal from a handover destination base station, and thus radio quality deteriorates. Therefore, even if the mobile station connects to a low traffic-load base station, a throughput improvement effect is limited.

Further, according to Patent Literature 2, areas are partitioned by stationary blocks which do not take loads into account. Therefore, when loads are unbalanced between blocks to which mobile stations belong, loads are still unbalanced between beams after an accommodation destination of the mobile stations is changed. Further, when a beam is formed by using only position information, each beam cannot accommodate a mobile station as each area is set depending on a radio wave propagation environment. As a result, it is not possible to secure radio quality of the mobile station.

Object of Present Invention

The present invention has been made based on the above-mentioned knowledge, and an example object of the present invention is to provide a coverage control method, a base station apparatus, a wireless communication system and a base station control program which can correct an unbalance between traffic loads of specific cells while securing radio quality of a mobile station, and improve a user throughput which has been lowered due to concentration of the traffic loads.

Solution to Problem

To solve the above-mentioned problem, a coverage control method, a base station apparatus, a wireless communication system and a base station control program according to the present invention mainly employ the following characteristic configurations.

(1) A coverage control method according to an example aspect of the present invention is
a coverage control method of a wireless communication system that includes: a first cell; at least one second cell whose coverage at least partially overlaps the first cell; and at least one mobile station that is communicating in the first cell, wherein the coverage control method including:
a load detecting step of, at a side of the first cell, detecting that a load of the first cell is higher than a preset first load threshold;
an accommodation candidate cell selecting step of, at a side of the first cell, selecting an accommodation candidate cell from the at least one second cell based on a preset load condition, the selected accommodation candidate cell being a candidate to which the at least one mobile station accommodated in the first cell is unloaded, and the preset load condition being related to a coverage target communication load that is a coverage control execution target;
a continuously accommodated mobile station selecting step of, at a side of the first cell, selecting a continuously accommodated mobile station from the at least one mobile station accommodated in the first cell based on radio quality of the selected accommodation candidate cell, the continuously accommodated mobile station continuing to be a coverage control target of the first cell; and
a coverage controlling step of, at a side of the first cell, performing the coverage control of the first cell by targeting at the selected continuously accommodated mobile station.

(2) A base station apparatus according to an example aspect of the present invention is
a base station apparatus in a wireless communication system that includes: a first cell; at least one second cell whose coverage at least partially overlaps the first cell; and at least one mobile station that is communicating in the first cell, and
the base station apparatus that forms the first cell includes:
load detecting means for detecting that a load of the first cell is higher than a preset first load threshold;

accommodation candidate cell selecting means for selecting an accommodation candidate cell from the at least one second cell based on a preset load condition, the selected accommodation candidate cell being a candidate to which the mobile station accommodated in the first cell is unloaded, and the preset load condition being related to a coverage target communication load that is a coverage control execution target;
continuously accommodated mobile station selecting means for selecting a continuously accommodated mobile station from the at least one mobile station accommodated in the first cell based on radio quality of the selected accommodation candidate cell, the continuously accommodated mobile station continuing to be a coverage control target of the first cell; and
coverage controlling means for performing the coverage control of the first cell by targeting at the selected continuously accommodated mobile station.

(3) A wireless communication system according to an example aspect of the present invention is
a wireless communication system that includes:
a base station apparatus that forms a first cell;
at least another base station apparatus that forms a second cell whose coverage partially overlaps the first cell; and
at least one mobile station that is communicating in the first cell, wherein
the base station apparatus that forms the first cell includes:
load detecting unit for detecting that a load of the first cell is higher than a preset first load threshold;
accommodation candidate cell selecting unit for selecting an accommodation candidate cell from the at least one second cell based on a preset load condition, the accommodation candidate cell being a candidate to which the at least one mobile station accommodated in the first cell is unloaded, and the preset load condition being related to a coverage target communication load that is a coverage control execution target;
continuously accommodated mobile station selecting unit for selecting a continuously accommodated mobile station from the at least one mobile station accommodated in the first cell based on radio quality of the selected accommodation candidate cell, the continuously accommodated mobile station continuing to be a coverage control target of the first cell; and
coverage controlling unit for performing the coverage control of the first cell by targeting at the selected continuously accommodated mobile station.

(4) A base station control program according to an example aspect of the present invention is
a base station control program that is executed by a computer in a base station apparatus that forms a first cell to control an operation of the base station apparatus in a wireless communication system that includes: the base station apparatus that forms the first cell; at least another base station apparatus that forms a second cell whose coverage partially overlaps the first cell; and at least one mobile station that is communicating in the first cell, wherein the operation includes:
load detection processing of detecting that a load of the first cell is higher than a preset first load threshold;
accommodation candidate cell selection processing of selecting an accommodation candidate cell from the second cell based on a preset load condition, the accommodation candidate cell being a candidate to which the mobile station accommodated in the first cell is unloaded, and the preset load condition being related to a coverage target communication load that is a coverage control execution target;

continuously accommodated mobile station selection processing of selecting a continuously accommodated mobile station from the mobile station accommodated in the first cell based on radio quality of the selected accommodation candidate cell, the continuously accommodated mobile station continuing to be a coverage control target of the first cell; and coverage control processing of performing the coverage control of the first cell by targeting at the selected continuously accommodated mobile station.

Advantageous Effects of Invention

The coverage control method, the base station apparatus, the wireless communication system and the base station control program according to the present invention can provide the following example effect.

That is, the present invention can correct an unbalance between traffic loads of specific cells while securing radio quality of a mobile station, and improve a user throughput which has been lowered due to concentration of the traffic loads. This is because a mechanism which selects a mobile station and controls a coverage by targeting at the selected mobile station to correct an unbalance between traffic loads of cells based on radio quality of an accommodation candidate cell of the mobile station.

DESCRIPTION OF EMBODIMENTS

Figure 1:
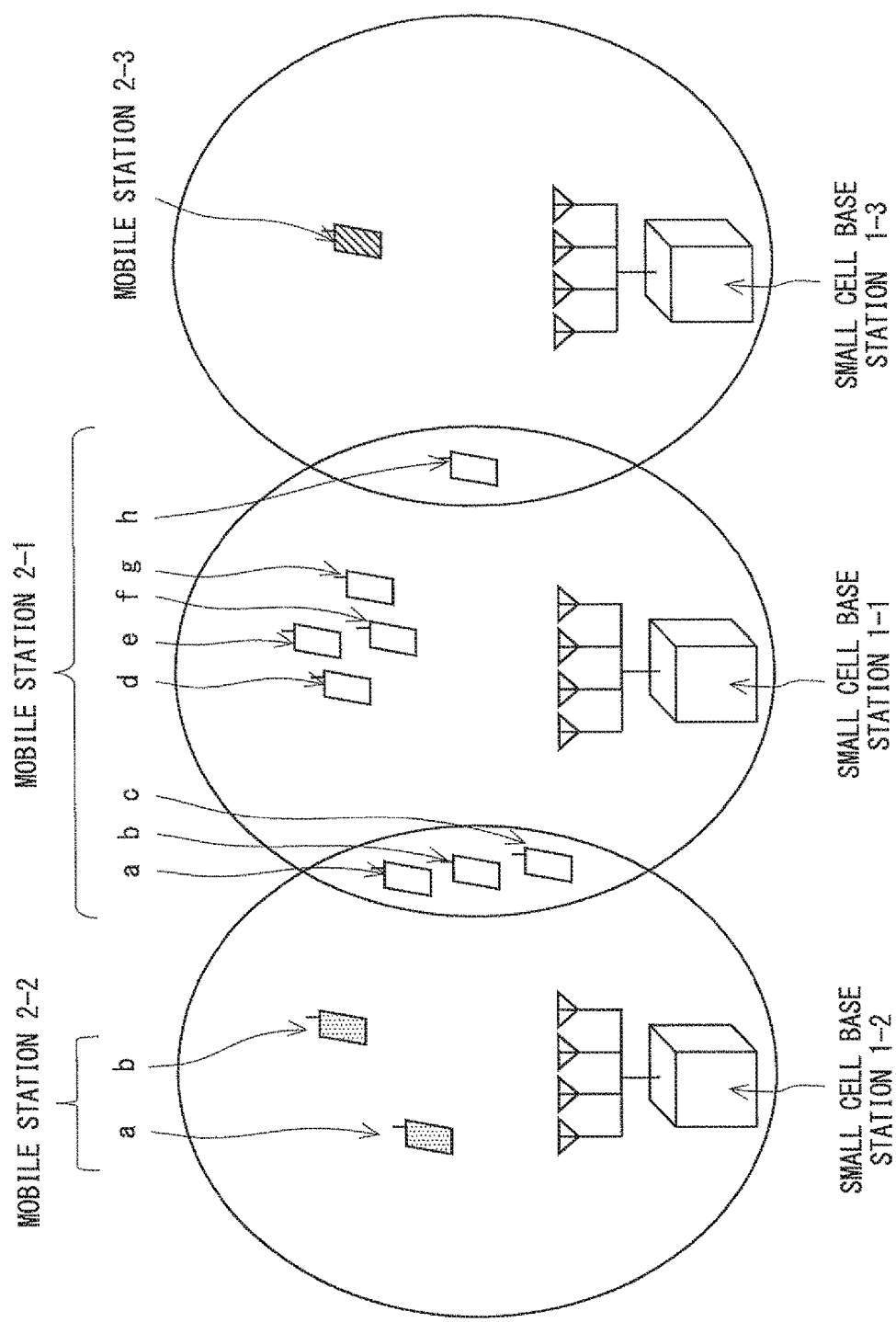
FIG. 1 is a system configuration diagram illustrating an example of a system configuration of a wireless communication system including small cell base stations and mobile stations according to the first example embodiment of the present invention.

Preferred example embodiments of a coverage control method, a base station apparatus, a communication system and a base station control program according to the present invention will be described below with reference to the accompanying drawings. In this regard, the coverage control method, the base station apparatus and the wireless communication system according to the present invention will be described below. Naturally, a computer in the base station apparatus may carry out this coverage control method as an executable base station control program or may record the base station control program in a computer readable recording medium. Naturally, drawing reference numerals assigned to each drawing are assigned to each component as an example to help understanding of the present invention for ease of description, and do not intend to limit illustrated aspects of the present invention. Further, the same components will be assigned the same drawing reference numerals in each following drawing, and overlapping explanation of the same components will be omitted except a necessary case for clarification of explanation.

(Features of Present Invention)

Outlines of features of the present invention will be described first prior to description of the example embodiments of the present invention. The present invention controls a coverage for a mobile station accommodated in a cell in a high load state under wireless communication environment in which at least two or more cells coexist with coverages partially overlapping each other. Features of the present invention include selecting a neighboring low-load cell which is a load unloading destination from a high-load cell, selecting a mobile station to be unloaded from the high load cell based on radio quality of the selected cell, and enabling controlling a coverage of the high load cell by targeting at mobile stations other than the selected mobile station. More specifically, the present invention mainly includes following four aspects.

A first aspect according to the present invention is a coverage control method that includes: a first cell; at least one second cell whose coverage at least partially overlaps the first cell; and at least one mobile station that is communicating in the first cell, wherein the coverage control method including:

a load detecting step of, at a side of the first cell, detecting that a load of the first cell is higher than a preset first load threshold;

an accommodation candidate cell selecting step of, at a side of the first cell, selecting an accommodation candidate cell from the at least one second cell based on a preset load condition, the selected accommodation candidate cell being a candidate to which the at least one mobile station accommodated in the first cell is unloaded, and the preset load condition being related to a coverage target communication load that is a coverage control execution target;

a continuously accommodated mobile station selecting step of, at a side of the first cell, selecting a continuously accommodated mobile station from the at least one mobile station accommodated in the first cell based on radio quality of the selected accommodation candidate cell, the continuously accommodated mobile station continuing to be a coverage control target of the first cell; and a coverage controlling step of, at a side of the first cell, performing the coverage control of the first cell by targeting at the selected continuously accommodated mobile station.

A second aspect according to the present invention is a base station apparatus in a wireless communication system that includes: a first cell; at least one second cell whose coverage at least partially overlaps the first cell; and at least one mobile station that is communicating in the first cell, and the base station apparatus that forms the first cell includes:

load detecting means for detecting that a load of the first cell is higher than a preset first load threshold;

accommodation candidate cell selecting means for selecting an accommodation candidate cell from the at least one second cell based on a preset load condition, the selected accommodation candidate cell being a candidate to which the mobile station accommodated in the first cell is unloaded, and the preset load condition being related to a coverage target communication load that is a coverage control execution target;

continuously accommodated mobile station selecting means for selecting a continuously accommodated mobile station from the at least one mobile station accommodated in the first cell based on radio quality of the selected accommodation candidate cell, the continuously accommodated mobile station continuing to be a coverage control target of the first cell; and coverage controlling means for performing the coverage control of the first cell by targeting at the selected continuously accommodated mobile station.

A third aspect according to the present invention is a wireless communication system that includes:

a base station apparatus that forms a first cell;

at least another base station apparatus that forms a second cell whose coverage partially overlaps the first cell; and at least one mobile station that is communicating in the first cell, wherein the base station apparatus that forms the first cell includes:

load detecting unit for detecting that a load of the first cell is higher than a preset first load threshold;

accommodation candidate cell selecting unit for selecting an accommodation candidate cell from the at least one second cell based on a preset load condition, the accommodation candidate cell being a candidate to which the at least one mobile station accommodated in the first cell is unloaded, and the preset load condition being related to a coverage target communication load that is a coverage control execution target;

continuously accommodated mobile station selecting unit for selecting a continuously accommodated mobile station from the at least one mobile station accommodated in the first cell based on radio quality of the selected accommodation candidate cell, the continuously accommodated mobile station continuing to be a coverage control target of the first cell; and coverage controlling unit for performing the coverage control of the first cell by targeting at the selected continuously accommodated mobile station.

A fourth aspect according to the present invention is a base station control program that is executed by a computer in a base station apparatus that forms a first cell to control an operation of the base station apparatus in a wireless communication system that includes: the base station apparatus that forms the first cell; at least another base station apparatus that forms a second cell whose coverage partially overlaps the first cell; and at least one mobile station that is communicating in the first cell, wherein the operation includes:

load detection processing of detecting that a load of the first cell is higher than a preset first load threshold;

accommodation candidate cell selection processing of selecting an accommodation candidate cell from the second cell based on a preset load condition, the accommodation candidate cell being a candidate to which the mobile station accommodated in the first cell is unloaded, and the preset load condition being related to a coverage target communication load that is a coverage control execution target;

continuously accommodated mobile station selection processing of selecting a continuously accommodated mobile station from the mobile station accommodated in the first cell based on radio quality of the selected accommodation candidate cell, the continuously accommodated mobile station continuing to be a coverage control target of the first cell; and coverage control processing of performing the coverage control of the first cell by targeting at the selected continuously accommodated mobile station.

<First Example Embodiment According to Present Invention>

Next, a first example embodiment of a coverage control method to which the present invention is applied will be described in detail with reference to the drawings. A case where a coverage is controlled for a mobile station accommodated in a cell in a high load state under a wireless communication environment in which at least two or more cells are present will be described as the coverage control method of the wireless communication system according to the first example embodiment. In the case, a neighboring low-load cell which is a load unloading destination from a high-load cell is selected, a mobile station to be unloaded from the high-load cell is selected based on radio quality of the selected cell, and a coverage of the high-load cell is controlled by targeting at mobile station other than the selected mobile station.

(Explanation of Configuration Example of First Example Embodiment)

FIG. 1 is a system configuration diagram illustrating an example of a system configuration of a wireless communication system including small cell base stations and mobile stations according to the first example embodiment of the present invention. A case where a LTE (Long Term Evolution) mode is applied to the wireless communication system, and a TDD (Time Division Duplex) mode for using the same frequency in uplink and downlink and shifting communication timings in the uplink and the downlink on a time domain will be described below as the first example embodiment. Naturally, the present invention is not limited only to such a case.

As illustrated in FIG. 1, the wireless communication system according to the first example embodiment includes a plurality of transmission/reception antennas, and is configured to include at least one or more small cell base stations 1 which form small cells of one frequency, and one or more mobile stations 2 which communicate with the small cell base stations 1. The system configuration example illustrated in FIG. 1 indicates a case where the small cell base stations 1 include three small cell base stations 1-1, 1-2 and 1-3, and the small cell base station 1-1 is connected with the eight mobile stations 2 of mobile stations 2-1*a*, 2-1*b*, 2-1*c*, 2-1*d*, 2-1*e*, 2-1*f*, 2-1*g* and 2-1*h* and is in a high load state. Further, the small cell base station 1-2 which is the one neighboring small cell base station 1 of the small cell base station 1-1 is connected with the two mobile stations 2-2*a* and 2-2*b* and is in a low load state. The small cell base station 1-3 which is the other neighboring small cell base station 1 is connected with the one mobile station 2-3 and is in a low load state.

Further, as illustrated in FIG. 1, the three mobile stations 2 of the mobile stations 2-1*a*, 2-1*b* and 2-1*c* connected to the small cell base station 1-1 are located in an area which overlaps an area of a small cell of the neighboring small cell base station 1-2. Furthermore, the mobile station 2-1*h* connected to the small cell base station 1-1 is located in an area which overlaps an area of a small cell of the neighboring small cell base station 1-2.

Naturally, the numbers of the small cell base stations 1 and the mobile stations 2 in FIG. 1, positions of the mobile stations 2 and the number of cells per small cell base station 1 are exemplary, and are not limited to those in FIG. 1. Further, each small cell is overlaid on a wide macrocell (not illustrated) formed by a macro base station, and an area which is outside a range of a coverage of a small cell is assumed to be covered by the macrocell. Furthermore, the frequencies used in the small cell and the macrocell may be different from each other or may be the same. The first example embodiment assumes different frequencies. In this regard, the small cells use the same frequency.

Figure 2:
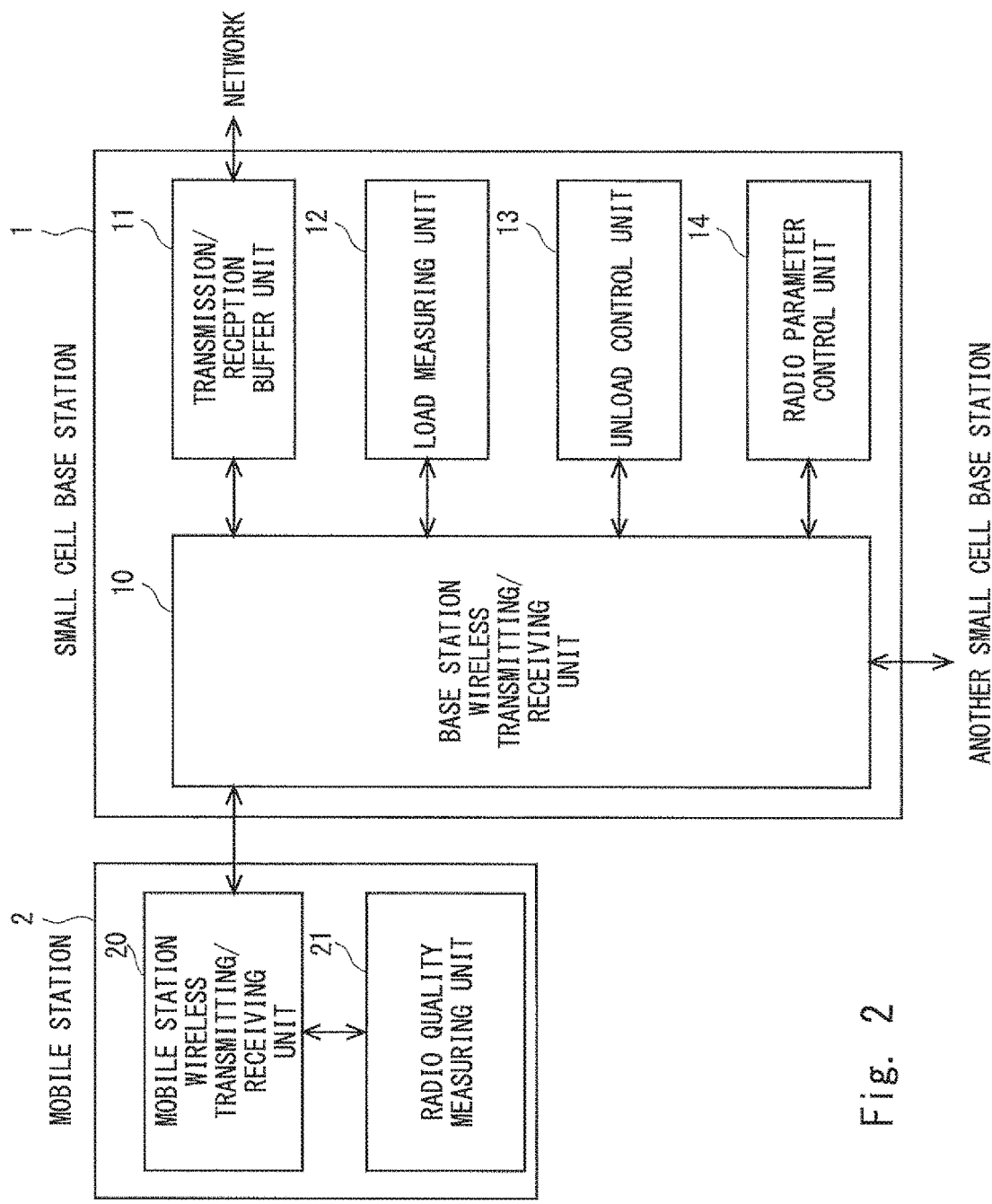
FIG. 2 is a block diagram illustrating an example of the internal configurations of a small cell base station and a mobile station in a wireless communication system according to the first example embodiment of the present invention.

Next, internal configurations of the small cell base stations 1 and the mobile stations 2 illustrated in FIG. 1 will be described in detail with reference to FIG. 2. FIG. 2 is a block diagram illustrating an example of the internal configurations of the small cell base station 1 and the mobile station 2 in the wireless communication system according to the first example embodiment of the present invention. In this regard, the three small cell base stations 1-1, 1-2 and 1-3 illustrated in FIG. 1 each employ the same internal configuration. Further, the mobile stations 2-1*a* to 2-1*h*, 2-2*a*, 2-2*b* and 2-3 illustrated in FIG. 1 each employ the same internal configuration. FIG. 2 illustrates the example of the respective internal configurations of the small cell base station 1 and the mobile station 2. The internal configuration of each apparatus will be described in order below.

First, the internal configuration of the small cell base station 1 will be described. As illustrated in FIG. 2, the small cell base station 1 is configured to include at least a base station wireless transmitting/receiving unit 10, a transmission/reception buffer unit 11, a load measuring unit 12, an unload control unit 13 and a radio parameter control unit 14.

The base station wireless transmitting/receiving unit 10 includes basic wireless transmitting/receiving functions of the own small cell base station 1 of performing wireless communication with the mobile stations 2 and the other small cell base stations 1. The basic functions include the following functions. (1) A transmitting function of transmitting a control signal such as a downlink reference signal and a data signal to the mobile stations 2, (2) A receiving function of receiving a control signal including an uplink reference signal and a data signal from the mobile stations 2, (3) A scheduler function of selecting the mobile station 2 which is a downlink data transmission destination, and allocating frequency resources (PRB: Physical Resource Blocks) and an MCS (Modulation and Coding Schemes) to the selected mobile station 2, (4) A signal processing function of a plurality of transmission/reception antenna elements, (5) A report condition setting function of setting a report condition of radio quality of each cell per mobile station 2, and (6) A load information exchanging function of exchanging load information between the small cell base stations 1.

In this regard, (4) the signal processing function will be supplementarily described as follows. The small cell base station 1 includes a plurality of transmission/reception antenna elements. A plurality of transmission/reception antenna elements are disposed in, for example, a linear array pattern at intervals of a half wavelength. Hence, the signal processing function of the base station wireless transmitting/receiving unit 10 can form a transmission beam, estimate an arrival angle of a received beam, and measure downlink channel information (e.g., a channel matrix including responses of a phase and an amplitude of each combination between the transmission/reception antennas). In this regard, a general technique of this field such as a MUSIC (Multiple Signal Classification) of using an eigenvalue and an eigenvector of a correlation matrix may be applied to estimate the arrival angle of the received beam.

Further, (5) the report condition setting function will be supplementarily described as follows. The report condition is selected from and set to one of periodic reporting of making a report at a preset predetermined cycle and event trigger reporting of making a report when a measurement value of radio quality is a preset predetermined value or more. The set report condition is notified to each mobile station 2 by using a RRC connection reconfiguration message of changing a configuration of a RRC (Radio Resource Control) connection for exchanging a control signal.

Further, (6) the load information exchanging function will be supplementarily described as follows. Each small cell base station 1 is connected with the other small cell base stations 1 via wired lines or wireless lines. The base station wireless transmitting/receiving unit 10 can exchange information related to the own small cell base station 1 (e.g., information related to a load as described below) via the wired line or the wireless line by using, for example, a cycle of approximately several seconds as a minimum cycle.

The transmission/reception buffer unit 11 temporarily stores data transmitted to the mobile station 2 (or data transmitted from the mobile station 2 to a wireless network) via the wireless network. A buffer which configures the transmission/reception buffer unit 11 is prepared per user and per QCI (QoS Class Identifier). In this regard, the buffer may be physically the same buffer (one buffer is shared as hardware). In this regard, the QCI means an identification index of QoS (Quality of Service) indicating service quality provided by the wireless network.

The load measuring unit 12 measures a transmission buffer size of each mobile station 2 and the own cell (a total value of all mobile stations 2 in the own cell) as a traffic load. In this regard, the transmission buffer size refers to a transmission data amount stored in the transmission/reception buffer unit 11 of the small cell base station 1 interposed on a communication route during communication (e.g., Web browsing, video streaming or VoIP (Voice over Internet Protocol)) between the mobile station 2 and an application server. Further, the load measuring unit 12 provides load detecting means, too, for checking whether or not the measured load of the own cell (i.e., the total value of the transmission buffer sizes of all mobile stations 2 in the own cell) is higher than a preset size threshold as a first load threshold, and detecting that the load is high.

The unload control unit 13 uses radio quality of another cell measured by each mobile station 2 (i.e., radio quality of a cell of another small cell base station 1 measured by each mobile station 2 and reported to the connected small cell base station 1) and a transmission buffer size of each mobile station 2 and each cell measured by the load measuring unit 12 to control a coverage of the own cell which controls an area covered by the own cell and then select other cells (referred to as "accommodation candidate cells" below) to which a load is expected to be unloaded from the own cell, and mobile stations (referred to as "non-accommodation mobile stations") which are unloaded to the accommodation candidate cell. In addition, even after controlling the coverage of the cell, the unload control unit 13 continues accommodating in the same cell all mobile stations (referred to as "accommodated mobile stations" below) which are located in the cell of the small cell base station 1 and connected to the small cell base station 1, i.e., the rest of mobile stations (referred to as "continuously accommodated mobile stations") except the non-accommodation mobile stations.

That is, the unload control unit 13 provides accommodation candidate cell selecting means for selecting accommodation candidate cells which are candidates to which the mobile stations 2 accommodated in the own cell are unloaded, from other cells whose coverages at least partially overlap the own cell based on a preset load condition related to a coverage target communication load which is a coverage control execution target. Further, the unload control unit 13 provides continuously accommodated mobile station selecting means, too, for selecting the continuously accommodated mobile station which continues to be the coverage control target mobile station 2 in the own cell after the coverage control, from all accommodated mobile stations accommodated in the own cell based on radio quality in the selected accommodation candidate cell. Furthermore, the unload control unit 13 provides non-accommodation mobile station selecting means, too, for selecting the rest of the mobile stations 2 other than the selected continuously accommodated mobile station as the non-accommodation mobile stations which are unloaded to the selected accommodation candidate cell.

The radio parameter control unit 14 controls a radio parameter for adjusting a coverage. In the first example embodiment, at least a beam forming weight of a transmission beam including a downlink reference signal is used as the radio parameter. The radio parameter control unit 14 controls at least the directivity of the transmission beam including the downlink reference signal. That is, the radio parameter control unit 14 provides coverage controlling means for controlling at least the directivity of the transmission beam including the downlink reference signal, and controlling a coverage of the own cell by targeting at the continuously accommodated mobile station.

Next, the internal configuration of the mobile station 2 in FIG. 2 will be described. The mobile station 2 is configured to include at least a mobile station wireless transmitting/receiving unit 20 and a radio quality measuring unit 21.

The mobile station wireless transmitting/receiving unit 20 includes basic wireless transmitting/receiving functions of the mobile station 2 of performing wireless communication with the small cell base station 1. The basic functions include a transmitting function of transmitting a control signal including an uplink reference signal and a data signal to the small cell base station 1, and a receiving function of receiving a control signal including a downlink reference signal from the small cell base station 1 and a data signal.

The radio quality measuring unit 21 includes a function of measuring radio quality of a connected cell (own cell) and other cells which exist around the connected own cell. In the first example embodiment, RSRP (Reference Signal Received Power) which is received power of a downlink reference signal is used as the radio quality. For example, in FIG. 1, each of the mobile stations 2-1a to 2-1h connected to the small cell base station 1-1 measures the received power RSRP from the connected small cell base station 1-1 as radio quality of the own cell, and measures the received power RSRP from both of the small cell base stations 1-2 and 1-3 as radio quality of the other cells.

Information related to the received power RSRP of each small cell base station 1 measured by the radio quality measuring unit 21 of the mobile station 2 is reported to the connected small cell base station 1 via the mobile station wireless transmitting/receiving unit 20 based on the report condition (one condition of periodic reporting and event trigger reporting) notified in advance from the connected small cell base station 1 as radio quality of each radio cell.

That is, the radio quality measuring unit 21 measures radio quality of other cells whose coverage at least partially overlaps the own cell in which the mobile station 2 is accommodated, and reports the information related to the measured radio quality of the other cells to the connected small cell base station 1 which forms the own cell based on the report condition specified in advance in the own cell. The report condition is one of reporting (periodic reporting) of the information related to the measured radio quality of the other cells on a regular basis at a preset cycle, and event trigger reporting of, when detecting the radio quality of the other cells which takes a higher value than a preset quality threshold, reporting the information related to the detected radio quality of the other cells with identification information for specifying the other cells.

The small cell base station 1 which has received the information related to the radio quality of the radio cell from the connected mobile station 2 delivers the received information related to the radio quality of each radio cell to the unload control unit 13 via the base station wireless transmitting/receiving unit 10. As described above, the unload control unit 13 can learn radio quality of cells of other small cell base stations measured by the mobile station 2, i.e., radio quality of the other cells based on the information related to the radio quality of each radio cell.

(Description of Operation of First Example Embodiment)

Figure 3:
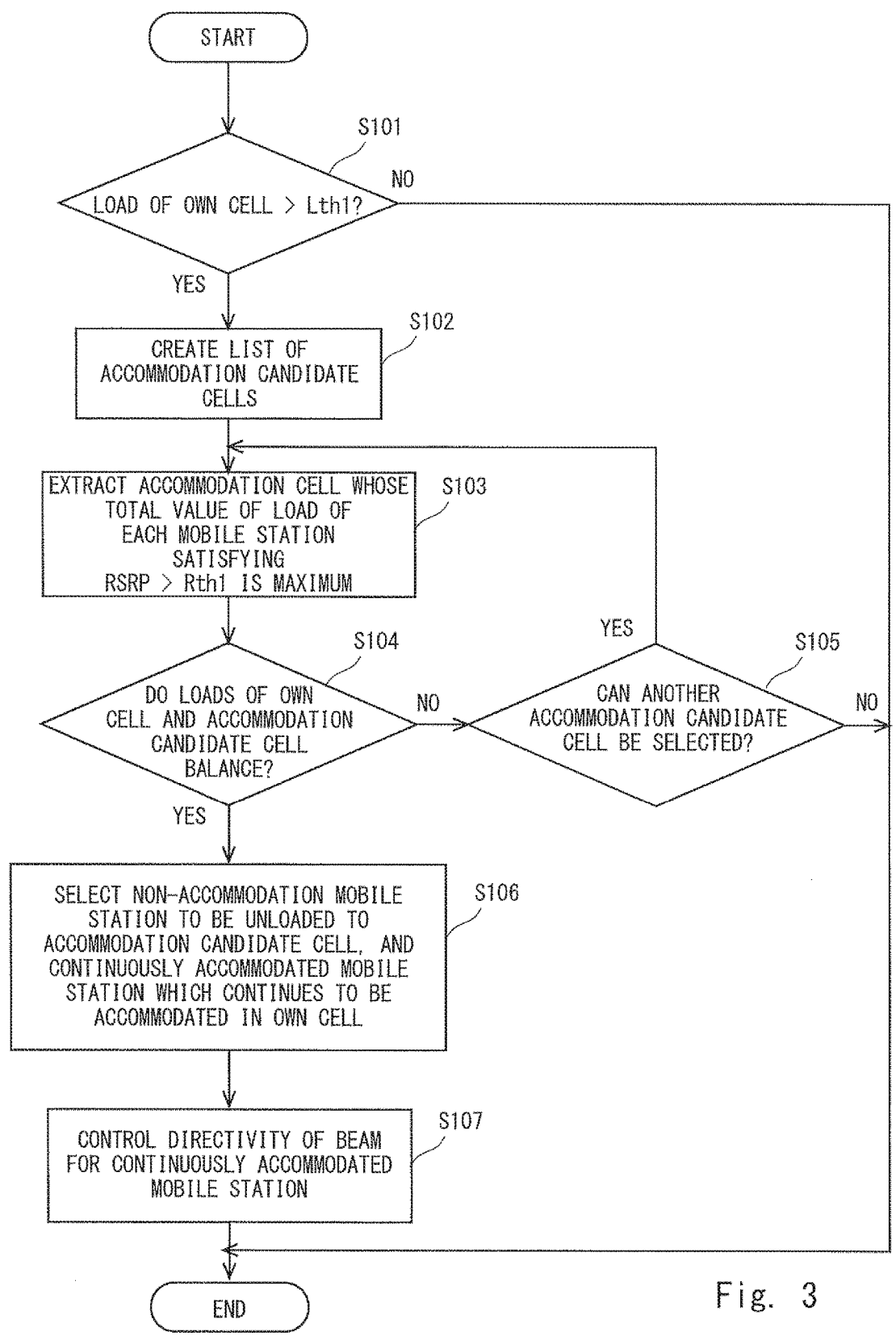
FIG. 3 is a flowchart illustrating an example of an operation procedure performed by a small cell base station to realize a coverage control method according to the first example embodiment of the present invention.

Next, an operation of the small cell base station 1 illustrated in FIGS. 1 and 2 will be described in detail in the first example embodiment. First, an example of a coverage controlling operation of the small cell base station 1 illustrated in FIGS. 1 and 2 will be described with reference to a flowchart of FIG. 3. FIG. 3 is the flowchart illustrating an example of an operation procedure performed by a small cell base station to realize the coverage control method according to the first example embodiment of the present invention, and cyclically performed at preset time intervals by each small cell base station 1.

When the flowchart of FIG. 3 is activated, the load measuring unit 12 measures a transmission buffer size as a load of the own cell (a total value of transmission buffer sizes allocated to all mobile stations 2 in the own cell connected with the own small cell base station 1) to determine whether or not the cell of the own small cell base station 1, i.e., the own cell ("first cell") is in a high load state, and compares the measured transmission buffer size with a preset predetermined size threshold Lth1 ("first load threshold") (step S101). When the measured load of the own cell, i.e., the transmission buffer size is higher than the size threshold Lth1 (YES in step S101), the load measuring unit 12 determines that the own cell is in the high load state, and the flow moves to processing subsequent to step S102. That is, step S101 is a load detecting step of detecting that the load of the own cell ("first cell") is higher than the size threshold Lth1 which is a preset first load threshold for high load detection.

Meanwhile, when the load of the own cell, i.e., the transmission buffer size is the size threshold Lth1 or less (NO in step S101), the load measuring unit 12 regards that the own cell is in the low load state and it is not necessary to perform coverage control, and finishes the flowchart of FIG. 3. In this regard, the system configuration example illustrated in FIG. 1 assumes that, in case of the small cell base station 1-1 of the three small cell base stations 1-1 to 1-3, the own cell is determined to be in the high load state in step S101 and, in case of the small cell base stations 1-2 and 1-3, the own cell is determined to be in the low load state in step S101.

When the flow moves to step S102, to prepare for unloading of the load of the own cell in the high load state, the unload control unit 13 first creates a list of accommodation candidate cells which are unloading destination candidates from one or a plurality of other neighboring cells ("second cells") whose coverages at least partially overlap. That is, when, for example, the event trigger reporting is notified as the report condition notified in advance from the connected small cell base station 1, each mobile station 2 connected to this small cell base station 1 operates as follows.

To measure radio quality of the own cell and the other cells, each mobile station 2 first measures the received power RSRP from the connected small cell base station 1 as the received power RSRP of the own cell ("first cell"), and measures the received power RSRP from each of the other small cell base stations 1 which are not connected as the received power RSRP of each of the other cells ("second cell"). Then, each mobile station 2 determines whether or not there is the received power RSRP of the other cells which satisfy a condition that the measured received power RSRP of each of the other cells is higher than a preset received power threshold Rth1 ("first quality threshold"). When there is the higher received power RSRP of the other cells than the received power threshold Rth1, each mobile station 2 reports information related to the received power RSRP satisfying the condition and IDs (Identifiers) for specifying the other small cell base stations 1 which form the other cells with the received power RSRP of the own cell, to the connected small cell base station 1. In this regard, the received power threshold Rth1 is set in advance to each small cell base station 1, and is notified in advance to the connected mobile station 2 from the small cell base station 1 when the mobile station 2 is connected.

When receiving the information related to the IDs (identifiers) for specifying the other small cell base stations 1 having the higher received power RSRP than the received power threshold Rth1, from one mobile station of the connected mobile stations 2, the small cell base station 1 which forms the own cell sets and registers the information related to the other small cell base stations 1 which are unloading target (reconnection target) candidates of the mobile station 2 connected to the own small cell base station 1, i.e., the other cells as the accommodation candidate cells of the mobile station 2 in preparation for coverage control to create an accommodate candidate cell list (a list for setting and registering information related to the other small cell base stations 1 having the higher received power RSRP than the received power threshold Rth1, i.e., the other cells). In the accommodation candidate cell list, the information related to the other accommodation candidate cells of the mobile station 2 is linked to a mobile station ID for specifying the mobile station 2 which has transmitted the report and is set and registered, and information related to a total value of a transmission buffer size of each set and registered mobile station 2 is also recorded per accommodation candidate cell.

When creating the accommodation candidate cell list is finished, the flow moves to step S103, and the unload control unit 13 selects an accommodation candidate cell which is expected as a load unloading destination of the own cell from each accommodation candidate cell (each of the other cells) set and registered in the accommodation candidate cell list (step S103). In this regard, a method for selecting the accommodation candidate cell which is expected as an unloading destination includes, for example, referring to the information related to the total value of the transmission buffer size of each mobile station 2 (i.e., each mobile station 2 satisfying the condition that the received power RSRP of the accommodation candidate cell is higher than the received power threshold Rth1) recorded per accommodation candidate cell in the accommodation candidate cell list, and selecting an accommodation candidate cell whose total value of the transmission buffer size of each mobile station 2 (in other words, a load of each mobile station 2 satisfying the condition that radio quality of the accommodation candidate cell is higher than the preset first quality threshold) is highest as a load unloading destination accommodation candidate cell of the own cell.

In this regard, when it is determined in step S105 described below that it is possible to select another accommodation candidate cell and the flow returns to the processing in step S103, an accommodation candidate cell whose total value of the transmission buffer size of each mobile station 2 is the second highest is selected as the load unloading destination accommodation candidate cell of the own cell from the rest of accommodation candidate cells except the accommodation candidate cell which is selected once as the unloading destination accommodation candidate cell. In this regard, an accommodation candidate cell may be selected not only from the accommodation candidate cell whose total value of the transmission buffer size of each mobile station 2 is maximum but also from, for example, one of accommodation candidate cells whose total value of the transmission buffer size of each mobile station 2 is a preset predetermined value ("second load threshold") or more.

When the accommodation candidate cell which is expected as the load unloading destination of the own cell is selected, the unload control unit 13 next determines whether or not loads of the own cell and the selected accommodation candidate cell balance more than before unloading by unloading the load of the own cell to the accommodation candidate cell selected in step S103.

In this regard, a load balancing determination condition may be a condition satisfying following equation (1) in case of, for example, a load L1 of the own cell before unloading (the load of the own cell measured in step S101), a load L2 of the accommodation candidate cell before unloading (information related to a load obtained from the other small cell base stations 1 which are the accommodation candidate cells), a predicted load L1' of the own cell after unloading (a value obtained by subtracting the total value of the transmission buffer size of each mobile station 2 from the load L1 of the own cell before the unloading), and a predicted load L2' of the accommodation candidate cell after unloading (a value obtained by adding the total value of the transmission buffer size of each mobile station 2 to the load L2 of the accommodation candidate cell before unloading).

$$L1-L2 > |L1'-L2'| \quad (1)$$

That is, when a difference (|L1'−L2'|) between the predicted loads of the own cell and the accommodation candidate cell after unloading is predicted to be lower than a difference (L1−L2) between the own cell and the accommodation candidate cell before unloading, it is regarded that the unloading balances the loads of the own cell and the accommodation candidate cell.

When the loads of the own cell and the selected accommodation candidate cell are predicted not to be balanced more than before unloading (when, for example, the condition according to equation (1) is not satisfied) (NO in step S104), the flow moves to processing in step S105 to check whether or not there are other accommodation candidate cells. That is, the unload control unit 13 searches in the accommodation candidate list, and determines whether or not there is another accommodation candidate cell other than the cell selected in step S103 in the accommodation candidate cell list (step S105).

When it is determined that there are other accommodation candidate cells other than the cell selected in step S103 in the accommodation candidate cell list and the other accommodation candidate cells can be further selected (YES in step S105), the flow returns to the processing to step S103 to perform processing of selecting the accommodation candidate cell whose total value of the transmission buffer size of each mobile station 2 is the second highest as the load unloading destination accommodation candidate cell of the own cell. Further, when there is no other accommodation candidate cell other than the cell selected in step S103 (NO in step S105), the own cell is in a high load state yet there is no other cell to which the load of the own cell can be unloaded, and therefore the flowchart of FIG. 3 is finished.

Meanwhile, when it is predicted in step S104 that the loads of the own cell and the selected accommodation candidate cell balance more than before unloading (when, for example, the condition according to equation (1) is satisfied) (YES in step S104), the accommodation candidate cell is determined as an unloading destination cell, and the flow moves to processing in step S106. In step S106, to unload the load from the own cell to the unloading destination cell, the unload control unit 13 selects a non-accommodation mobile station whose accommodation is changed (unloaded) to the another cell determined as the accommodation candidate cell in step S104 (i.e., the mobile station 2 which is disconnected with the own small cell base station 1 and whose accommodation is changed from the accommodation in the own cell to the accommodation in the another cell determined as the accommodation candidate cell) (step S106).

That is, step S102 to step S104 function as an accommodation candidate cell selecting step of selecting the accommodation candidate cell which is a candidate to which the mobile station 2 accommodated in the own cell ("first cell") is unloaded, from the other cells ("second cells") based on a preset load condition related to a coverage target communication load which is a coverage control execution target, and determining the unloading destination accommodation candidate cell.

In this regard, as the coverage target communication load, a total value of a transmission buffer size of each mobile station 2 satisfying a condition that the received power RSRP of the accommodation candidate cell is higher than the received power threshold Rth1 (i.e. the total value of the load of each mobile station 2 satisfying the condition that radio quality of the accommodation candidate cell is higher than a preset first quality threshold) is used. Further, by using the load condition as a condition that the coverage target communication load, i.e., the total value is a maximum value (or a value equal to or more than the preset second load threshold), the condition according to equation (1) holds, and a difference (|L1'−L2'|) between the predicted loads of the own cell and the accommodation candidate cell after unloading is smaller than the difference (L1−L2) between the predicted loads before unloading, i.e., the difference between the load of the own cell ("first cell") and the load of the accommodation candidate cell is smaller after unloading than before unloading, the another cell ("second cell") satisfying the load condition is selected and determined as the accommodation candidate cell.

Further, a method for selecting the non-accommodation mobile station may include selecting the mobile station 2 indicated by a mobile station ID (information for specifying the mobile station 2) linked and recorded per accommodation candidate cell when creating the accommodation candidate cell list in step S102. The selected mobile station 2 is the mobile station 2 whose received power RSRP in the accommodation candidate cell determined as the unloading destination cell candidate is higher than the preset received power threshold Rth1. The selected mobile station 2 can secure desired radio quality (received power of a desired wave signal) in the accommodation candidate cell, too. Then, the rest of the mobile stations 2 except the non-accommodation mobile stations whose accommodation is changed to the accommodation candidate cell determined as the unloading destination cell among all mobile stations 2 in the own cell are selected as continuously accommodated mobile stations which continue to be accommodated in the own cell.

In this regard, selection of the continuously accommodated mobile station is equivalent to selection of a mobile station whose received power RSRP in the accommodation candidate cell is the received power threshold Rth1 or less (i.e., the mobile station 2 which does not report information related to the received power RSRP in the accommodation candidate cell determined as the unloading destination cell candidate in step S102).

That is, step S106 functions as a continuously accommodated mobile station selecting step of selecting the continuously accommodated mobile stations which are the mobile stations 2 which continue to be the coverage control targets in the own cell after coverage control, from all accommodated mobile stations accommodated in the own cell based on the radio quality of the selected accommodation candidate cell, and as a non-accommodation mobile station selecting step of selecting the rest of the mobile stations 2 other than the selected continuously accommodated mobile stations as the non-accommodation mobile station to be unloaded to the selected accommodation candidate cell. In this regard, with regard to the continuously accommodated mobile station selecting step, step S106 has been described as a step of selecting as the continuously accommodated mobile stations the rest of the mobile stations 2 except the non-accommodation mobile stations whose accommodation is changed to the accommodation candidate cell determined as the unloading destination cell among all mobile stations 2 in the own cell. By contrast with this, as described above, this is equivalent to selecting as the continuously accommodated mobile stations the mobile stations 2 satisfying a condition that the mobile station is not the non-accommodation mobile station, i.e., a condition that the received power RSRP of the accommodation candidate cell is the power threshold Rth1 or less among all mobile stations 2 in the own cell (a condition that the radio quality of the accommodation candidate cell is the first quality threshold or less).

Then, to unload the selected non-accommodation mobile station, the radio parameter control unit 14 changes the directivity of transmission beams of all mobile stations 2 including the selected non-accommodation mobile stations, too, and accommodated in the own cell before unloading, and controls the directivity of the transmission beam for the continuously accommodated mobile stations which continue to be accommodated in the own cell even after unloading (step S107). That is, step S107 is at least a coverage controlling step of controlling the directivity of the transmission beam including a downlink reference signal, and controlling a coverage of the own cell by targeting at the continuously accommodated mobile station. In this regard, to control the directivity of the transmission beam, a steering vector method for controlling only the directivity without changing a shape (a width or a gain) of a beam by using an arrival angle of an uplink reference signal from a continuously accommodated mobile station may be applied. Further, a direction of the directivity of the transmission beam may be, for example, an average value of an arrival angle of each continuously accommodated mobile station or may be a median value of a maximum angle and a minimum angle of the arrival angle of each continuously accommodated mobile station.

Figure 4:
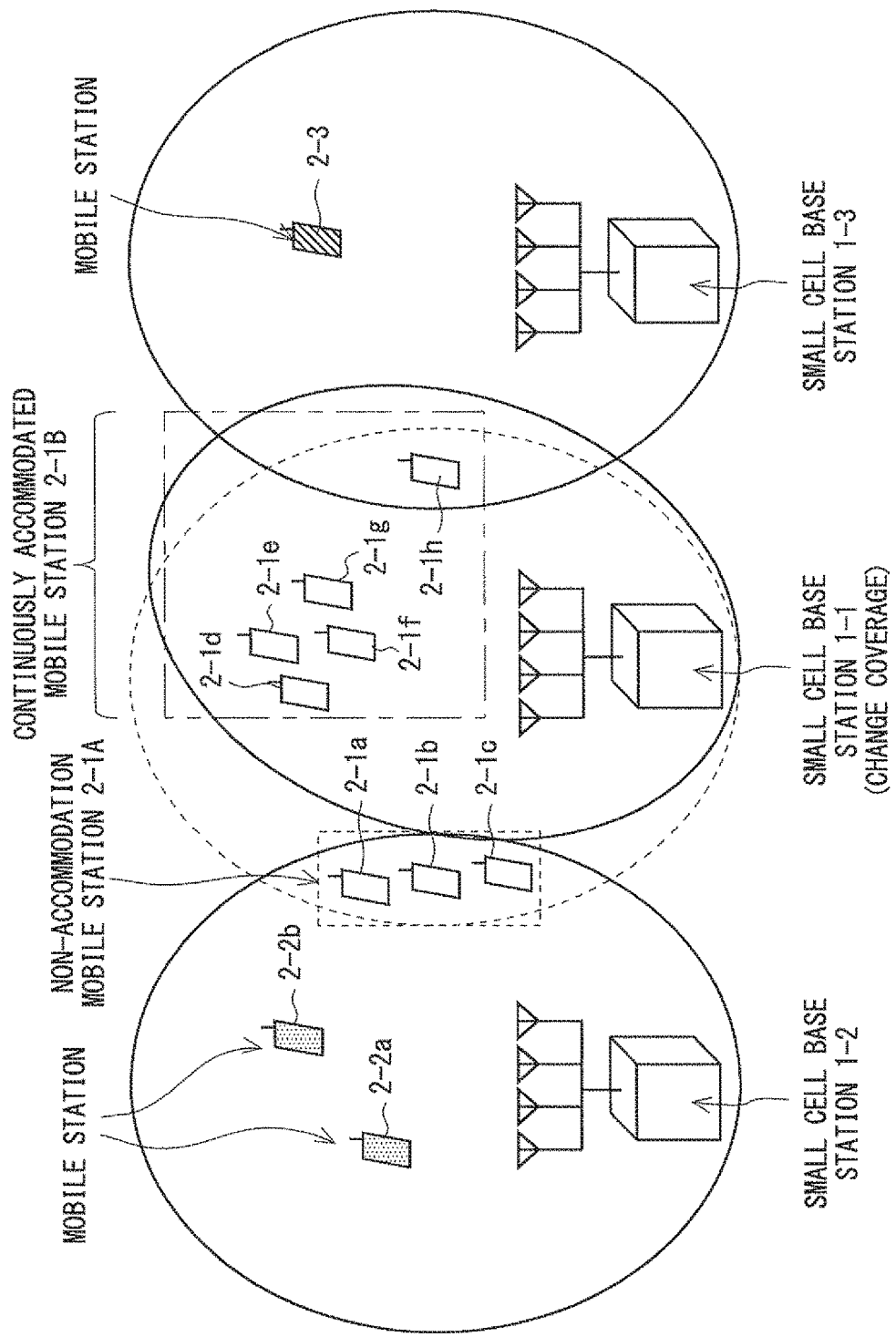
FIG. 4 is an explanatory view illustrating an example of how a coverage of an own cell changes when the coverage control method illustrated in FIG. 3 is applied to a small cell base station in the wireless communication system in FIG. 1.

Next, how the coverage of the own cell changes when an operation of the coverage control method illustrated in FIG. 3 is performed in the small cell base station 1-1 (high-load small cell base station) of the wireless communication system in FIG. 1 will be more specifically described with reference to FIG. 4. FIG. 4 is an explanatory view illustrating an example of how the coverage of the own cell changes when the coverage control method illustrated in FIG. 3 is applied to the small cell base station 1-1 in the wireless communication system in FIG. 1. In this regard, the explanatory view illustrated in FIG. 4 assumes that the load of each mobile station 2 is equal for ease of description, and assumes that the size threshold Lth1 for determining whether or not the load is high is a transmission buffer size corresponding to the five mobile stations 2. The explanatory view in FIG. 4 illustrates that only the small cell base station 1-1 connected with the eight mobile stations 2 among the three small cell base stations 1-1, 1-2 and 1-3 satisfies the condition in step S101 illustrated in FIG. 3 (the condition that a load of the own cell in the small cell base station 1 is higher than the size threshold Lth1).

Further, the explanatory view illustrated in FIG. 4 illustrates that not only the received power RSRP from the small cell base station 1-1 but also the received power RSRP from the another neighboring small cell base station 1-2 of the three mobile stations 2-1a to 2-1c of the eight mobile stations 2-1a to 2-1h connected to the small cell base station 1-1 are higher than the preset received power threshold Rth1, the received power RSRP from the small cell base station 1-1 of the four mobile stations 2-1d to 2-1g is higher than the received power threshold Rth1 yet the received power RSRP from both of the neighboring small cell base stations 1-2 and 1-3 is equal to or less than the received power threshold Rth1, and Not only the received power RSRP from the small cell base station 1-1 but also the received power RSRP from the another neighboring small cell base station 103 of one mobile station 2-1h are higher than the received power threshold Rth1.

As illustrated in step S102 of FIG. 3, the high-load small cell base station 1-1 sets and registers information related to the low load small cell base stations 1-2 and 1-3 as accommodation candidate cells in the accommodation candidate cell list in which other unloading destination cells are set and registered. Further, in the accommodation candidate cell list, the three mobile stations 2 of the mobile stations 2-1a to 2-1c having the higher received power RSRP from the small cell base station 1-2 than the received power threshold Rth1 are set and registered as the mobile stations 2 linked to the small cell base station 1-2, and one mobile station 2 of the mobile station 2-1h having the higher received power RSRP from the small cell base station 1-3 than the received power threshold Rth1 is set and registered as the mobile station 2 linked to the small cell base station 1-3. That is, the total value of the loads of the mobile stations 2 linked to each accommodation candidate cell is higher in the cell of the small cell base station 1-2 than in the cell of the small cell base station 1-3.

Hence, in the explanatory view illustrated in FIG. 4, the small cell base station 1-2 to which more mobile stations 2-1 can be unloaded is selected in step S103 of FIG. 3 as an unloading destination accommodation candidate cell from the small cell base stations 1-2 and 1-3 set and registered in the accommodation candidate cell list in step S102 of FIG. 3 during coverage control in the small cell base station 1-1 (that is, while only one mobile station 2-1h can be unloaded to the small cell base station 1-3 as described above, the three mobile stations 2-1a to 2-1c can be unloaded to the small cell base station 1-2).

Then, in step S104 of FIG. 3, the loads of the own cell of the small cell base station 1-1 and the small cell base station 1-2 selected as an unloading destination accommodation candidate cell are predicted to be balanced more after unloading than before unloading. Therefore, the small cell base station 1-2 is determined as an unloading destination. That is, when the explanatory view in FIG. 4 assumes that all loads of the three selected mobile stations 2-1a to 2-1c (=3×load per 1 mobile station is assumed) can be unloaded, the difference (|L1'−L2'|) between the loads of the small cell base stations 1-1 and 1-2 after unloading changes from the difference from both of the loads (L1−L2 =(8−2)×load per 1 mobile station=6×load per 1 mobile station) before unloading, and becomes '0' (|L1'−L2'|=|(5−5)×load per 1 mobile station|=0). The difference satisfies the condition of L1−L2>|L1'−L2'| according to above equation (1), and therefore the small cell base station 1-2 is determined as an unloading destination.

When unloading the small cell base station 1-2 is determined, the operation in step S106 of FIG. 3 is executed. Then, the three mobile stations 2-1a to 2-1c encircled by a dotted line square in the explanatory view in FIG. 4 are selected as the non-accommodation mobile stations 2-1A whose accommodation is changed to the cell of the small cell base station 1-2. The rest of the five mobile stations 2-1d to 2-1h encircled by a dashed dotted line square are selected as the continuously accommodated mobile stations 2-1B which continue to be accommodated in the cell of the small cell base station 1-1.

Subsequently, in step S207 of FIG. 3, the small cell base station 1-1 performs coverage control, changes the directivity of a transmission beam of a radio wave including the non-accommodation mobile station 2-1A, too, to stably unload the non-accommodation mobile stations 2-1A including the three mobile stations 2-1a to 2-1c to the small cell base station 1-2 without deteriorating radio quality, and changes the coverage of the cell of the small cell base station 1-1 by controlling the directivity of the transmission beam of the radio wave to form a transmission beam of a radio wave for the continuously accommodated mobile stations 2-1B including the rest of the five mobile stations 2-1*d* to 2-1*h*. That is, the coverage indicated by a dotted line elliptical circle in the explanatory view in FIG. 4 is changed to a coverage indicated by a solid line elliptical line.

As described above in detail, in the first example embodiment, to correct an unbalance between loads of the cells based on the received power RSRP in an accommodation candidate cell, coverage control of selecting the unloading target non-accommodation mobile station 2-1A and continuously accommodated mobile station 2-1B, and controlling the directivity of the transmission beam by removing the non-accommodation mobile station 2-1A from a target and by targeting at the continuously accommodated mobile station 2-1B is performed. Consequently, it is possible to provide an effect that, while securing radio quality (received power of a desired wave signal) of the non-accommodation mobile station 2-1A after unloading, it is possible to improve a user throughput which has lowered due to concentration of the loads.

Further, the control procedure illustrated in the flowchart of FIG. 3 can be realized by causing a computer such as a microprocessor to execute a base station control program for controlling the base station apparatus. That is, the computer which executes the base station control program may be caused to select the unloading target non-accommodation mobile station 2-1A and perform coverage control by targeting at the continuously accommodated mobile station 2-1B.

In this regard, the first example embodiment describes a case where the transmission buffer size is used as a traffic load in the cell of the small cell base station 1. However, the traffic load is not limited to this. As a traffic load in the cell of the small cell base station 1, the number of active mobile stations, i.e., the number of communicating mobile stations which is the number of the mobile stations 2 which establish RRC (Radio Resource Control) connection and hold transmission data may be used, or a physical resource block usage (PRB usage), i.e., a resource usage of frequency resources defined based on, for example, a ratio of the number of physical resource blocks (PRB) actually allocated to each mobile station 2 to the number of all physical resource blocks (PRB) to which a physical downlink shared channel (PDSCH) can be allocated as frequency resources may be used, when a LTE (Long Term Evolution) mode is used for downlink data transmission.

In this regard, with regard to the transmission buffer size and the number of active mobile stations among traffic loads, an instantaneous value is calculated per cell in step S101 in the flowchart of FIG. 3, and a total value of an instantons value of each target mobile station 2 is calculated in step S103. By contrast with this, with regard to the physical resource block usage (PRB usage), fluctuation of the number of physical resource blocks (PRB) during a preset fixed time is taken into account. Therefore, a time average value of each cell is calculated in step S101, and a total value of a time average value of each target mobile station 2 is calculated in step S103.

Further, the first example embodiment has described a case where a total value of loads of mobile stations having higher radio quality of an accommodation candidate cell than the first quality threshold is used as a coverage target communication load for an accommodation candidate cell selection condition, and a condition that a load to be unloaded is maximum is used for a load condition. However, the accommodation candidate cell selection condition is not limited to this. For example, loads of other cells ("second cells") may be used as coverage target communication loads. A preset second cell load condition of a load before unloading (i.e., a condition that, for example, the load is a minimum value or a value less than the preset second cell load threshold) may be used for the load condition, and the other cells ("second cells") satisfying this condition may be selected as the accommodation candidate cells. In the example in the explanatory view of FIG. 4, the small cell base station 1-3 whose number of the mobile stations 2 connected before unloading is one which is the mobile station 2-3 has a lower load than those of the small cell base station 1-2 whose number of the mobile stations 2 connected before unloading is two which are the mobile stations 2-2*a* and 2-2*b*. Therefore, as an accommodation candidate cell which is an unloading destination candidate, a cell formed by the small cell base station 1-3 of the lowest load before unloading may be selected.

Further, the first example embodiment has described a case where the accommodation candidate cell determination condition is a condition that loads of the own cell and the accommodation candidate cell balance. However, the accommodation candidate cell determination condition is not limited to this. For example, the accommodation candidate cell determination condition may be a condition that a load (L1') after unloading in a coverage control target cell in a high load state before unloading lowers to a preset lower limit value or less or a load (L2') of the accommodation candidate cell after unloading does not exceed a preset upper limit value.

Further, the first example embodiment has described a case where the directivity of a transmission beam including a downlink reference signal is used as a radio parameter for changing a coverage for a direction of the continuously accommodated mobile station. However, the radio parameter for changing the coverage is not limited to this. For example, transmission power of the small cell base station 1 and at least one direction of an antenna tilt angle (i.e., the directivity in the vertical direction) or an azimuth angle (i.e., the directivity in the horizontal direction) may be used. Further, with regard to transmission beam control, the above steering vector method and, in addition, a general technique in this wireless communication field such as a matched filter which calculates a transmission antenna weight by using channel information between transmission and reception antennas and directing strong directivity to a channel regarded to have a great amplitude response based on the calculated transmission antenna weight may be applied.

Furthermore, the first example embodiment has described a case where a measurement value of the received power RSRP is used as radio quality of another neighboring cell of a coverage control target cell which is used to select an accommodation candidate cell and a mobile station to be unloaded to the accommodation candidate cell. However, the radio quality of another cell is not limited to this. For example, radio quality which takes into account not only received power of a desired signal such as the received power RSRP but also received power of an interference signal may be used.

The radio quality which takes into account both such a desired signal and an interference signal is, for example, RSRQ (Reference Signal Received Quality) which is received quality of a downlink reference signal. The received quality (RSRQ) of the downlink reference signal is defined based on a ratio of received power (RSRP) of a downlink reference signal with respect to total received power of all communication bands (RSSI: Received Signal Strength Indicator). In this regard, the total received power (RSSI) includes received power (RSRP) from the own cell and received power (RSRP) from all of other surrounding cells, too. Consequently, each mobile station 2 can measure received quality (RSRQ) of downlink reference signals of the own cell and the other cells similar to received power (RSRP) of the downlink reference signal.

Further, the first example embodiment has described a case where the received power RSRP of another neighboring cell of the coverage control target own cell is compared with a preset predetermined received power threshold Rth1 to select the accommodation candidate cell and the non-accommodation mobile station to be unloaded to the accommodation candidate cell. However, the comparing method is not limited to this. For example, received power (RSRP) of a downlink reference signal of the coverage control target own cell (the cell of the small cell base station 1-1 in the explanatory view of FIG. 4) may be further used to compare a relative value of received power (RSRP) (i.e., a relative value of radio quality) of another cell which is the accommodation candidate cell with respect to the own cell ("first cell"), with an additional preset relative received power threshold Rth2 ("third quality threshold"), and select the mobile station 2 equal to or less than the relative received power threshold Rth2 or less as a continuously accommodated mobile station and the mobile station 2 larger than the relative received power threshold Rth2 as an unloading target non-accommodation mobile station. That is, the accommodation candidate cell and the non-accommodation mobile station are selected by taking into account received power (RSRP) of a desired signal in the accommodation candidate cell and interference power from the own cell as a reference, so that it is possible to secure more stable radio quality in the accommodation candidate cell.

Further, the first example embodiment has described that the small cell base stations 1 are connected with each other via wired lines. However, the connection is not limited to this. The small cell base stations 1 may be connected with each other via wireless lines or may be connected with each other by using the wireless lines and the wired lines in combination.

Further, in the first example embodiment, when the accommodation candidate cell is selected, each mobile station 2 satisfying the condition that the received power RSRP is higher than the received power threshold Rth1 is extracted, a total value of the transmission buffer size of each extracted mobile station 2 is calculated, and then the accommodation candidate cell satisfying a condition that the total value of the transmission buffer size of each mobile station 2 is maximum and, when unloading is performed, a difference between a load of the own cell and a load of the accommodation candidate cell is predicted to be smaller than before unloading is selected as a load unloading destination accommodation candidate cell of the own cell. The selection is not limited to this. An execution order may be changed. That is, each mobile station 2 satisfying a condition that the received power RSRP of the accommodation candidate cell is higher than the preset received power threshold Rth1 may be extracted from the mobile stations 2 accommodated in the own cell in order of the higher received power RSRP of the accommodation candidate cell in a range satisfying the condition that a difference between the load of the own cell and the load of the accommodation candidate cell is predicted to be smaller than before unloading, to calculate a total value obtained by calculating a sum of the transmission buffer size of each extracted mobile station 2, and determine an accommodation candidate cell having the maximum total value as a load unloading destination accommodation candidate cell of the own cell.

<Second Example Embodiment According to Present Invention>

Next, the second example embodiment of a coverage control method to which the present invention is applied will be described. A configuration of a wireless communication system and internal configurations of a small cell base station 1 and a mobile station 2 according to the second example embodiment are the same system configuration and internal configurations as those in FIGS. 1 and 2 according to the first example embodiment. However, part of an operation of a coverage control method of the wireless communication system according to the second example embodiment differs from that of the flowchart of FIG. 3 according to the first example embodiment.

That is, the second example embodiment differs from the first example embodiment in a condition of the coverage control based on a selection result of an accommodation candidate cell, a non-accommodation mobile station and a continuously accommodated mobile station. A case where a new condition is added to execution of coverage control to prevent a cell boundary cell from being made in an area in which the mobile stations 2 concentrate will be described. That is, an inter-cell interference generally becomes strong at a cell boundary, and therefore when a cell boundary is set in the area in which the mobile stations 2 concentrate, the inter-cell interference deteriorates radio quality. Further, the number of non-accommodation mobile stations which are not unloaded as expected even if coverage control is performed increases. As a result of execution of the coverage control, only received power of a desired signal decreases, and therefore radio quality of these non-accommodation mobile stations deteriorates. According to the second example embodiment, it is possible to avoid such a situation.

Figure 5:
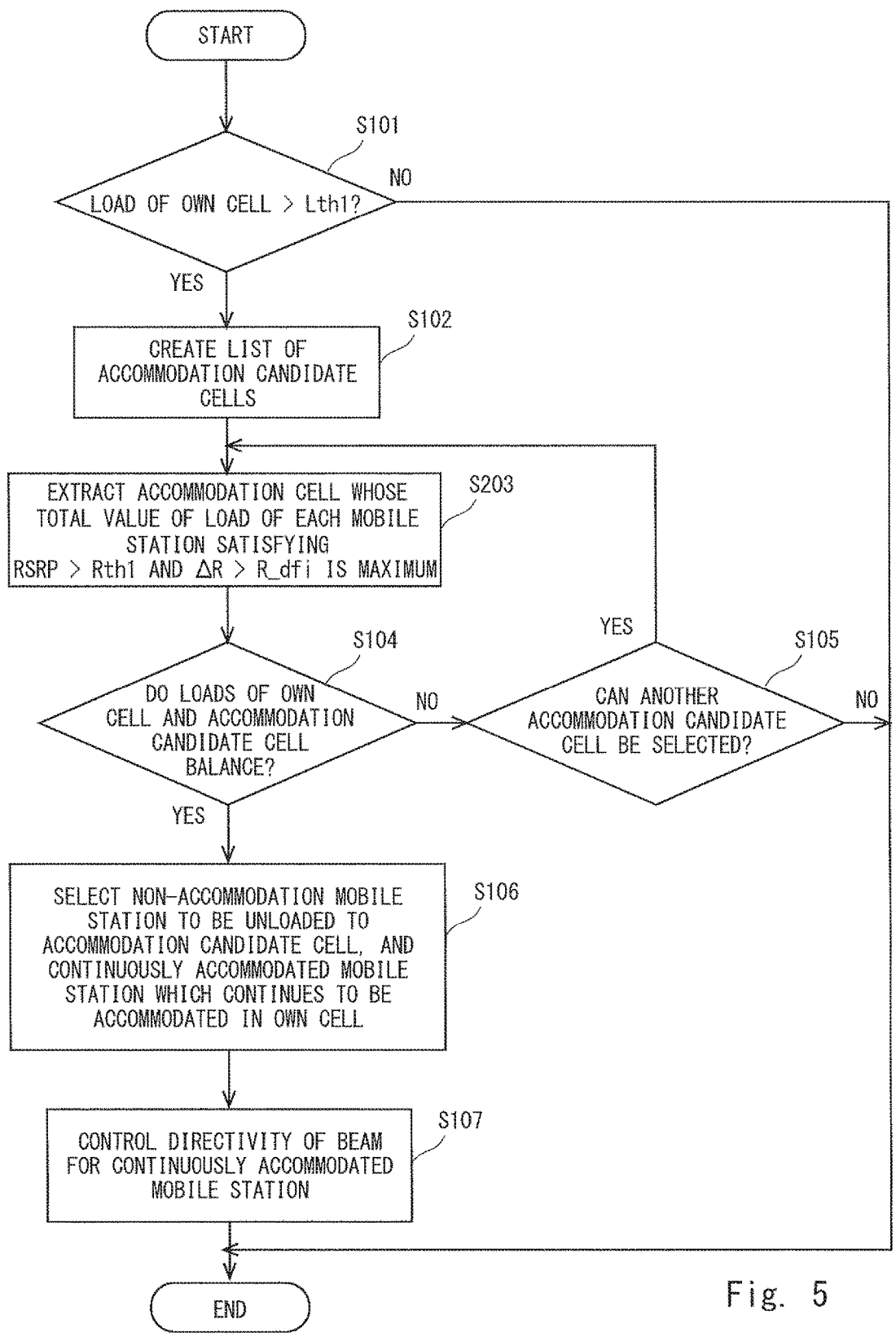
FIG. 5 is a flowchart illustrating an example of an operation procedure of a small cell base station for realizing the coverage control method according to the second example embodiment of the present invention.

An example of a coverage controlling operation of the small cell base station 1 according to the second example embodiment will be described in detail with reference to a flowchart of FIG. 5. FIG. 5 is a flowchart illustrating an example of an operation procedure of the small cell base station 1 for realizing the coverage control method according to the second example embodiment of the present invention. Similar to the flowchart of FIG. 3 according to the first example embodiment, this flowchart is cyclically performed at preset time intervals in the small cell base station 1. A difference between the coverage control method illustrated in the flowchart of FIG. 5 and the coverage control method in FIG. 3 is that an accommodation candidate cell selection condition described with reference to step S103 of FIG. 3. is replaced with an operation in step S203 to which hatching is applied. The respective operations of the other steps (steps S101, S102 and S104 to S107) in the flowchart of FIG. 5 are the same as those in the flowchart of FIG. 3, and will be assigned the same step numbers as those in FIG. 4 and will not be described in detail.

In step S203 in the flowchart of FIG. 5, an unload control unit 13 selects an accommodation candidate cell, a non-accommodation mobile station and a continuously accommodated mobile station by taking into account a difference between received power RSRP of the mobile stations 2 with respect to the accommodation candidate cell to avoid execution of coverage control which makes a cell boundary in an area in which a plurality of mobile stations 2 locate near or near the area.

More specifically, the unload control unit 13 sorts the mobile stations 2 in order of the higher received power RSRP (rearranges the mobile stations 2 in a descending order of radio quality of accommodation candidate cells) by using the received power RSRP of the accommodation candidate cell in each mobile station 2, obtains a difference ($\Delta R$) between the received power RSRP of the own mobile station 2 and the received power RSRP of the mobile station 2 sorted next to the own mobile station 2 (a difference from radio quality of the mobile station 2 positioned at a next order) for each mobile station 2, and compares the obtained difference ($\Delta R$) and a preset difference threshold (R_dif) ("second quality threshold").

When the difference ($\Delta R$) from received power of the next mobile station 2 is higher than the difference threshold (R_dif), it is possible to regard that the mobile station 2 and the next mobile station 2 are sufficiently apart from each other. Consequently, the unload control unit 13 determines that it is possible to form a cell boundary between the mobile station 2 which is a target to calculate the difference ($\Delta R$) from the received power of the next mobile station, and the next mobile station 2, and selects this mobile station 2 as a non-accommodation mobile station.

Meanwhile, when the difference ($\Delta R$) from the received power of the next mobile station 2 is the difference threshold (R_dif) or less, it is possible to regard that the mobile station 2 and the next mobile station 2 are close to each other. Consequently, the unload control unit 13 determines that it is not possible to form a cell boundary between the mobile station 2 which is a target to calculate the difference ($\Delta R$) from the received power of the next mobile station 2, and the next mobile station 2, and selects the mobile station 2 as a continuously accommodated mobile station.

Finally, in step S203, the unload control unit 13 extracts each mobile station 2 satisfying both of a condition that the above condition of the difference ($\Delta R$), i.e., a condition that the difference ($\Delta R$) between received power of the target mobile station 2 and the next mobile station 2 is higher than the difference threshold (R_dif), and a condition described with reference to step S103 according to the first example embodiment, i.e., a condition that the received power RSRP is higher than a received power threshold Rth1, refers to information related to a total value of a transmission buffer size of each extracted mobile station 2 similar to step S103 according to the first example embodiment, and selects an accommodation candidate cell having a maximum total value of the transmission buffer size of each mobiles station 2 as a load unloading destination accommodation candidate cell of the own cell (step S203). In this regard, similar to the first example embodiment, selection is not limited to the accommodation candidate cell having the maximum total value of the transmission buffer size of each mobile station 2. One of accommodation candidate cells whose total values of the transmission buffer size of each mobile station 2 is a preset predetermined value ("second load threshold") or more may be selected.

The processing subsequent to step S203 is the same as those in the flowchart of FIG. 3 in the first example embodiment as described above. In this regard, the accommodation candidate cell which takes into account the above condition of the difference ($\Delta R$) in addition to the condition according to the first example embodiment is determined as an unloading destination cell. Therefore, in step S106 according to the second example embodiment, the mobile station 2 satisfying the above condition of the difference ($\Delta R$) among the mobile stations 2 linked to the accommodation candidate cell and recorded in the accommodation candidate cell (the mobile stations 2 satisfying the condition that the received power RSRP is higher than the received power threshold Rth1) is selected as the non-accommodation mobile station whose accommodation is changed to the accommodation candidate cell determined as the unloading destination cell. The rest of the mobile stations 2 except the non-accommodation mobile stations among all mobile stations 2 in the own cell are selected as continuously accommodated mobile stations which continue to be accommodated in the own cell.

As described above, in the second example embodiment, the condition of the difference ($\Delta R$) between the received power RSRP of the mobile stations 2 is taken into account in addition to the condition according to the first example embodiment to perform coverage control without creating a cell boundary in an area in which the mobile stations 2 concentrate. Consequently, it is possible to more reliably secure radio quality of the mobile station 2 existing in an area in which the mobile stations 2 concentrate compared to the first example embodiment.

Further, in the second example embodiment, when an accommodation candidate cell is selected, each mobile station 2 satisfying both of the above condition of the difference ($\Delta R$), i.e., the condition that the difference ($\Delta R$) between received power of the target mobile station 2 and the next mobile station 2 is higher than the difference threshold (R_dif), and the condition that the received power RSRP is higher than the received power threshold Rth1 is extracted, a total value of the transmission buffer size of each extracted mobile station 2 is calculated, and then an accommodation candidate cell satisfying a condition that the total value of the transmission buffer size of each mobile station 2 is maximum and, when unloading is performed, a difference between a load of the own cell and a load of an accommodation candidate cell is predicted to be smaller than before the unloading is selected as an unloading destination accommodation candidate cell of the load of the own cell. However, the selection is not limited to this, and an execution order may be changed. That is, when unloading is performed, each mobile station 2 of the mobile stations 2 accommodated in the own cell satisfying both of the above condition of the difference ($\Delta R$), i.e., the condition that the difference ($\Delta R$) between the received power of the target mobile station 2 and the next mobile station 2 is higher than the difference threshold (R_dif), and the condition that the received power RSRP is higher than the received power threshold Rth1 in a range satisfying the condition that the difference between the load of the own cell and the load of the accommodation candidate cell is predicted to be smaller than before unloading may be extracted, a total value of transmission buffer size of each target mobile station 2 having the higher received power RSRP of the accommodation candidate cell than that of each extracted mobile station 2 may be obtained, and the accommodation candidate cell having the maximum total value may be determined as a load unloading destination accommodation candidate cell of the own cell.

<Third Example Embodiment According to Present Invention>

Figure 6:
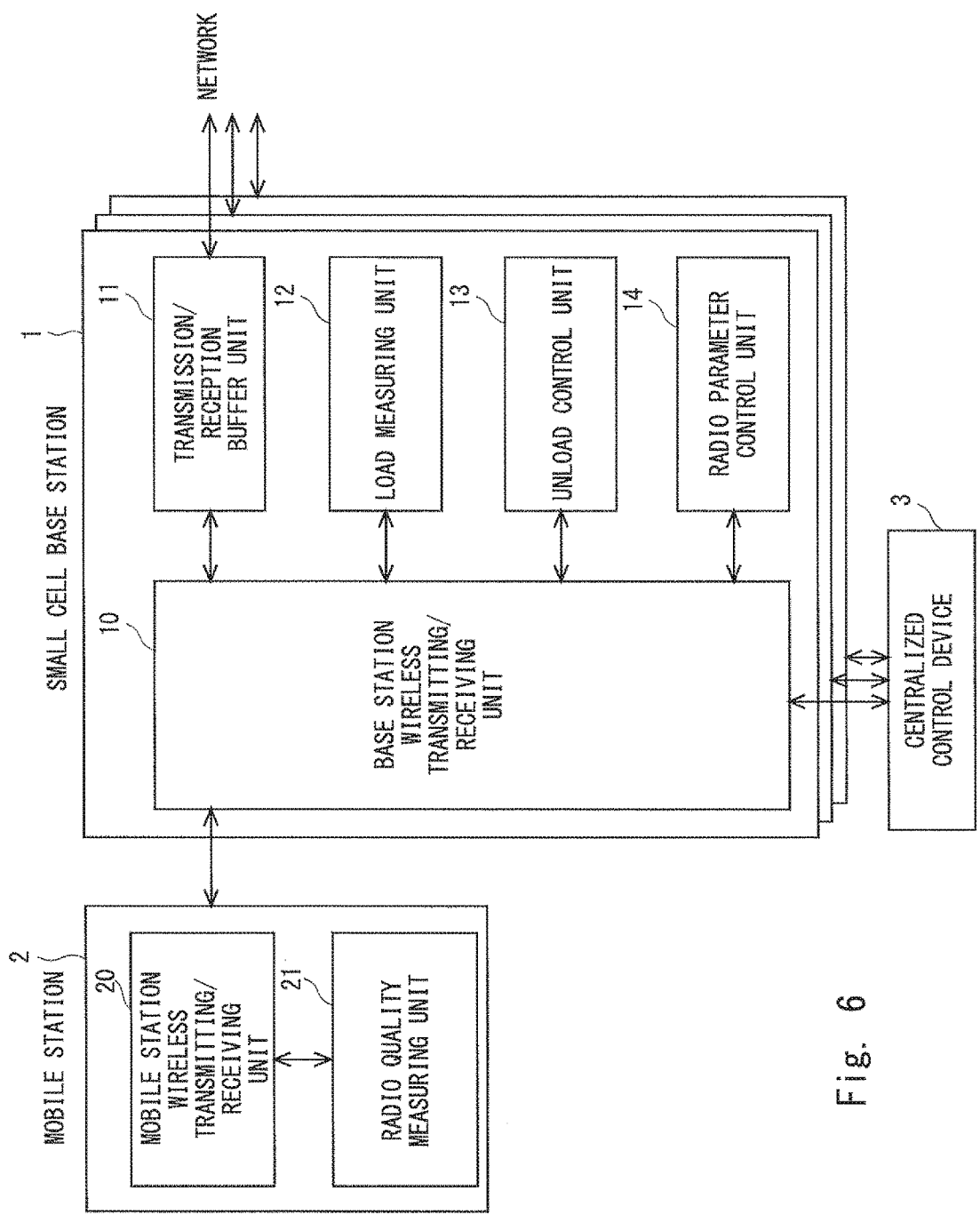
FIG. 6 is a block diagram illustrating internal configurations of a small cell base station and a mobile station in a wireless communication system according to the third example embodiment of the present invention, and an installation example of the centralized control device.

Next, the third example embodiment of a coverage control method to which the present invention is applied will be described. As illustrated in FIG. 6, a wireless communication system according to the third example embodiment is configured to include a system configuration of a wireless communication system according to the first example embodiment and, in addition, a centralized control device 3 which performs centralized management on a plurality of small cell base stations 1. FIG. 6 is a block diagram illustrating internal configurations of small cell base station and a mobile station in the wireless communication system according to the third example embodiment of the present invention, and an installation example of the centralized control device. In this regard, the internal configurations of the small cell base station 1 and a mobile station 2 illustrated in the block diagram in FIG. 6 are the same as those in the first example embodiment, and therefore overlapping description will be omitted.

The centralized control device 3 additionally installed in the third example embodiment can exchange information necessary for coverage control mutually between the small cell base stations 1, and consequently can perform coverage control of coordinating a plurality of small cell base stations 1. Further, by coordinating such coverage control between the small cell base stations 1, it is possible to synchronize and perform coverage control, too, on an accommodation candidate cell for a non-accommodation mobile station to be newly accommodated. Consequently, it is possible to increase the number of non-accommodation mobile stations and improve radio quality of each non-accommodation mobile station, too, compared to the first example embodiment.

As illustrated in the block diagram of FIG. 6, the centralized control device 3 is connected with base station wireless transmitting/receiving units 10 of a plurality of small cell base stations 1 via wired lines or wireless lines, and controls an exchange of the necessary information for the coverage control between the small cell base stations 1. In the third example embodiment, the centralized control device 3 uses information related to trigger of coverage control as information exchanged between the high-load small cell base stations 1 of a coverage control target (e.g., a small cell base station 1-1 illustrated in FIG. 1) and the small cell base station 1 (e.g., a small cell base station 1-2 illustrated in FIG. 1) which forms an accommodation candidate cell determined as an unloading destination, i.e., as information for synchronizing coverage control between the two small cell base stations 1, and uses position information of a position newly measured by a radio quality measuring unit 21 of the mobile station 2 as information related to transmission beam formation for the non-accommodation mobile station 2 whose accommodation is changed in the unloading destination small cell base station 1. In this regard, the following description assumes that each mobile station 2 cannot simultaneously connect to an own cell and other cells, and an arrival angle and channel information of the other cells cannot be measured.

Figure 7:
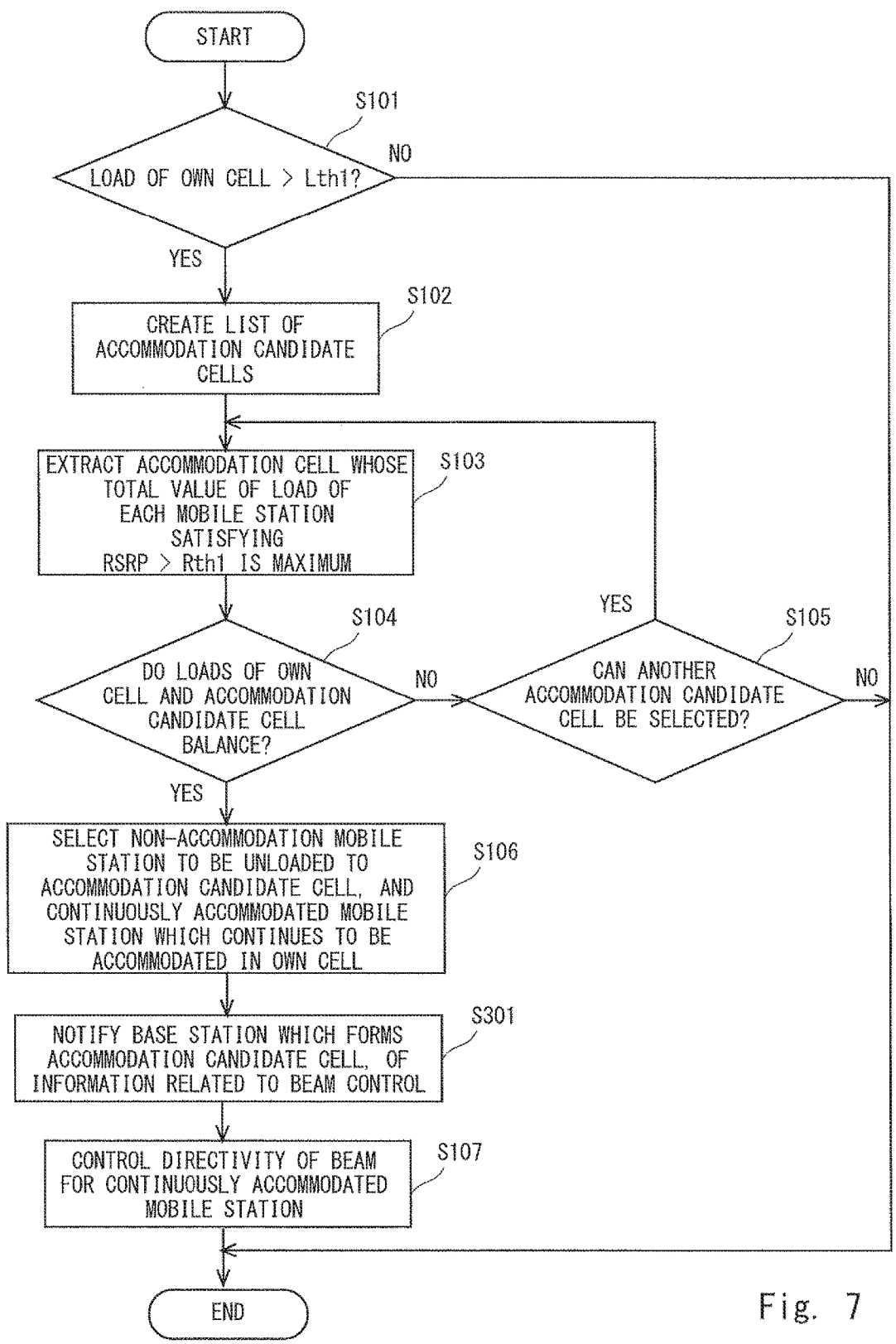
FIG. 7 is a flowchart illustrating an example of the operation procedure of a small cell base station for realizing the coverage control method according to the third example embodiment of the present invention.

Next, an operation example of coverage control according to the third example embodiment performed by the high-load small cell base station 1 (e.g., the small cell base station 1-1 illustrated in FIG. 1) will be described in detail with reference to the flowchart of FIG. 7. FIG. 7 is a flowchart illustrating an example of the operation procedure of the small cell base station 1 for realizing the coverage control method according to the third example embodiment of the present invention. Further, FIG. 7 illustrates an example where the high-load small cell base station 1 (e.g., the small cell base station 1-1 illustrated in FIG. 1) exchanges information via the centralized control device 3 to perform coverage control in collaboration with another unloading destination small cell base station 1 (e.g., the small cell base station 1-2 illustrated in FIG. 1). In this regard, similar to the flowchart of FIG. 3 according to the first example embodiment, the flowchart of FIG. 7 is also cyclically performed at preset time intervals by the small cell base station 1.

A difference between the coverage control method illustrated in the flowchart of FIG. 7 in the third example embodiment and the coverage control method in FIG. 3 is that only step S301 to which hatching is applied is newly added between step S106 and step S107 of FIG. 3. Each operation of the other steps (step S101 to step S107) of the flowchart of FIG. 7 is the same as those in the flowchart of FIG. 4, and therefore will be assigned the same step reference numerals as those in FIG. 3 and overlapping description will be omitted. In this regard, in the third example embodiment where coverage control is also performed in collaboration on another cell which is an unloading destination accommodation candidate cell, radio quality of a non-accommodation mobile station whose accommodation is changed to the another cell which is the unloading destination accommodation candidate cell can be expected to improve compared to the first example embodiment. Consequently, the number of non-accommodation mobile stations may be increased by using a smaller value than that in the first example embodiment for the received power threshold Rth1 used in steps S102 and S103.

When the flow moves to step S106 in the flowchart of FIG. 7 to determine to cause the small cell base station 1 which forms a high-load own cell to perform coverage control and determine an unloading destination accommodation candidate cell, a non-accommodation mobile station and a continuously accommodated mobile station, the flowchart moves to step S301.

In step S301 of the flowchart of FIG. 7, to realize coordinated coverage control between the small cell base stations 1 (more specifically, the high-load small cell base station (e.g., the small cell base station 1-1 illustrated in FIG. 1) which is a coverage control execution target, and the small cell base station 1 (e.g., the small cell base station 1-2 illustrated in FIG. 1) of an accommodation candidate cell determined as an unloading destination by the coverage controlling operation), the small cell base station 1 which forms the unloading destination accommodation candidate cell is notified of information related to trigger of coverage control and position information (or channel information depending on cases) of a non-accommodation mobile station as information related to beam control (step S301). That is, step S301 is a coverage control information notifying step of notifying the small cell base station 1 which forms the accommodation candidate cell of information for controlling the coverage of the accommodation cell by targeting at the selected non-accommodation mobile station. In this regard, by using information including information related to a coverage control timing as the information related to the trigger, it is possible to cause the unloading destination accommodation candidate cell, too, to perform coverage control simultaneously with the own cell.

Figure 8:
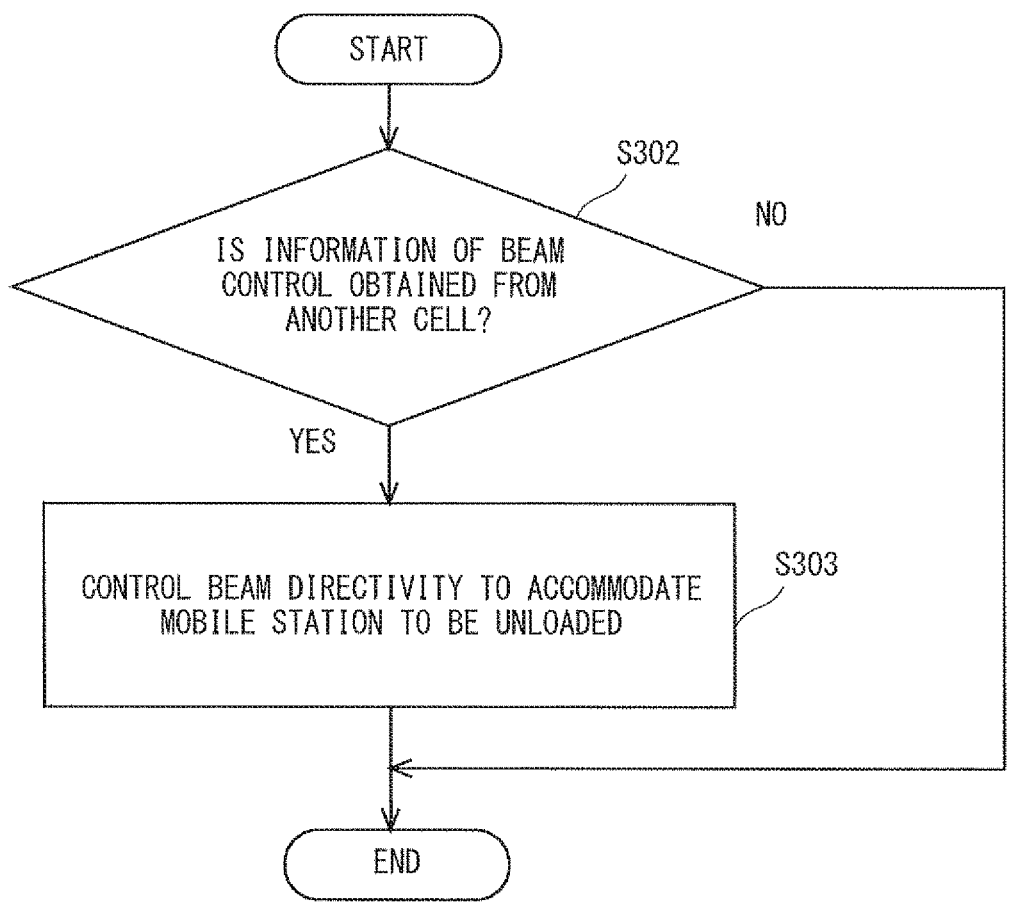
FIG. 8 is the flowchart illustrating an example of an operation procedure of an unloading destination small cell base station which performs coverage control in coordination with a coverage controlling operation of the small cell base station illustrated in FIG. 7.

Next, a coverage controlling operation of the low-load small cell base station 1 (e.g., the small cell base station 1-2 illustrated in FIG. 1) which forms an accommodation candidate cell determined as an unloading destination will be described with reference to a flowchart of FIG. 8. FIG. 8 is the flowchart illustrating an example of an operation procedure of the unloading destination small cell base station 1 which performs coverage control in coordination with the coverage controlling operation of the small cell base station 1 illustrated in FIG. 7. FIG. 8 illustrates an example where the unloading destination low-load small cell base station 1 (e.g., the small cell base station 1-2 illustrated in FIG. 1) exchanges information via the centralized control device 3 to perform coverage control in coordination with the high-load small cell base station 1 (e.g., the small cell base station 1-1 illustrated in FIG. 1).

In the flowchart of FIG. 8, the unloading destination small cell base station 1 monitors at a preset cycle whether or not the small cell base station 1 which forms another cell, i.e., the high-load small cell base station 1 which performs coverage control transmits information related to beam control (step S302). When the unloading destination small cell base station 1 detects that the information (the information including the information related to the trigger of the coverage control and the position information related to the beam control is transmitted from the small cell base station 1 which forms another cell (or the channel information depending on cases) of the non-accommodation mobile station), and the information related to the beam control is obtained (YES in step S302), the flow moves to processing in step S303.

When the flow moves to the processing in step S303, a radio parameter control unit 14 checks the position information or the channel information of the non-accommodation mobile station included in the information related to the beam control, and creates information related to directivity control of a transmission beam to be directed not only toward the already accommodated mobile stations 2 but also toward a non-accommodation mobile station to reliably accommodate the non-accommodation mobile station unloaded to the unloading destination small cell base station 1. That is, by, for example, obtaining for a non-accommodation mobile station to be unloaded, a physical arrival angle of the own small cell base station 1 based on the position information of the non-accommodation mobile station and the set position information of the own small cell base station 1 included in the information related to the beam control, adding and using the obtained physical arrival angle to and for an arrival angle of a radio wave from the currently accommodated mobile station 2 and applying the steering vector method, the radio parameter control unit 14 generates the information related to the directivity control of the transmission beam.

Subsequently, the radio parameter control unit 14 refers to the information related to the trigger of the coverage control included in the transmitted information related to the beam control, synchronizes a transmission beam controlling operation of the high-load small cell base station 1 of a transmission source cell side (a "first cell" side) which has transmitted the information related to the beam control, and performs the directivity control on the transmission beam for the already accommodated mobile station 2 and the non-accommodation mobile station to be newly accommodated based on the information related to the directivity control of the generated transmission beam (step S303). That is, step S303 is an accommodation candidate cell coverage controlling step of performing coverage control by targeting at the mobile stations 2 already accommodated in the accommodation candidate cell, and a non-accommodation mobile station to be newly accommodated based on the information notified from the high-load small cell base station 1. In step S303, the coverage control in the high-load small cell base station 1 of the transmission source cell side (the "first cell" side) triggers coverage control on the accommodation candidate cell based on the position information or the channel information related to the non-accommodation mobile station.

Figure 9:
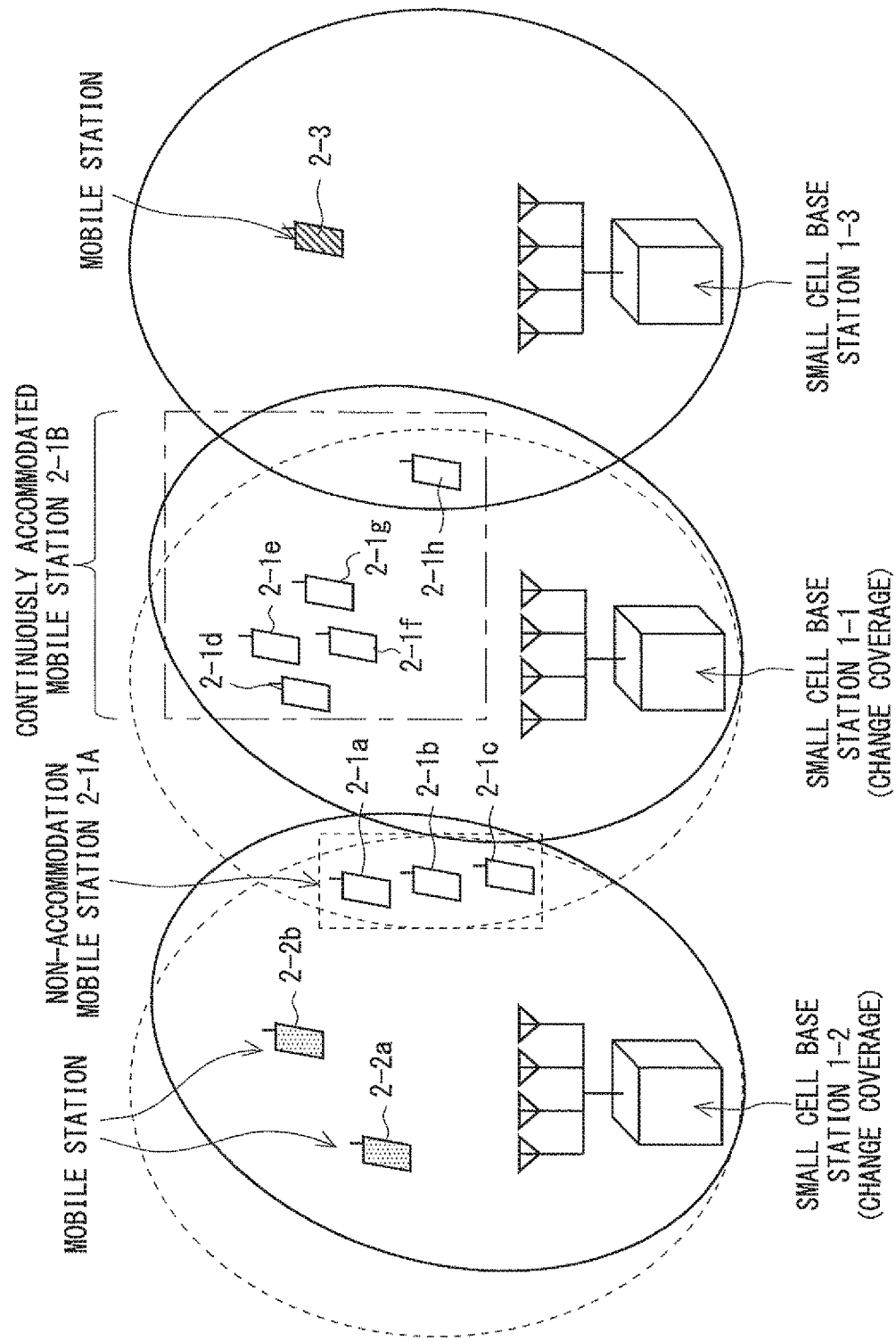
FIG. 9 is an explanatory view illustrating an example of how each cell coverage changes when the coordinated coverage control method in FIGS. 7 and 8 is applied to two small cell base stations in the wireless communication system in FIG. 1.

Next, how a cell coverage changes when the small cell base station 1-1 (high-load small cell base station 1) of the wireless communication system in FIG. 1 performs the operation of the coverage control method illustrated in FIG. 7 and the unloading destination small cell base station 1-2 (low-load small cell base station 1) performs the operation of the coverage control method illustrated in FIG. 8 in coordination with the small cell base station 1-1 will be more specifically described with reference to FIG. 9. FIG. 9 is an explanatory view illustrating an example of how the cell coverage changes when the wireless communication system in FIG. 1 applies the coordinated coverage control method in FIGS. 7 and 8 to the two small cell base stations 1-1 and 1-2. In this regard, the explanatory view of FIG. 9 differs from the explanatory view of FIG. 4 described in the first example embodiment in that the unloading destination low-load small cell base station 1-2 also performs coverage control in coordination with the high-load small cell base station 1-1.

In the explanatory view of FIG. 9, the coverage controlling operation of the high-load small cell base station 1-1 is similar to that of the explanatory view of FIG. 4, and three mobile stations 2-1a to 2-1c encircled by a dotted line square are selected as non-accommodation mobile stations 2-1A whose accommodation is changed to the cell of the unloading destination small cell base station 1-2, the rest of five mobile stations 2-1d to 2-1h encircled by a dashed-dotted line square are selected as continuously accommodated mobile stations 2-1B which continue to be accommodated in the cell of the small cell base station 1-1, and a coverage range of the own cell is changed from a coverage indicated by a dotted line ellipse to a coverage indicated by a solid line ellipse.

Further, in the explanatory view in FIG. 9, according to the coverage controlling operation of the unloading destination low-load small cell base station 1-2 which performs coverage control in coordination with the small cell base station 1-1, the small cell base station 1-2 also changes the coverage range of the own cell from the coverage indicated by the dotted line ellipse to the coverage indicated by the solid line ellipse. Thus, it is possible to further increase the received power RSRP of a desired signal in the non-accommodation mobile station 2-1A to be newly accommodated in the own cell compared to the explanatory view in FIG. 4, and consequently improve radio quality of the non-accommodation mobile station 2-1A.

Further, as described above, the unloading destination small cell base station 1-2 controls the directivity of a transmission beam to enable reliable accommodation of the non-accommodation mobile station 2-1A to be newly accommodated. Consequently, it is possible to change accommodation of the mobile stations 2 whose number is great as the number of the non-accommodation mobile stations 2-1A to the unloading destination small cell base station 1-2. Further, generally, it is also possible to more reliably avoid a situation, too, that mobile stations cannot help being unloaded to cells such as macrocells whose radio quality deteriorates compared to the small cells other than the small cells.

As described above in detail, in the third example embodiment, a coverage of an unloading destination accommodation candidate cell is controlled for non-accommodation mobile stations to be unloaded. Consequently, an increase in the number of non-accommodation mobile stations and improvement of radio quality are expected to provide a higher unloading effect more than that of the first example embodiment.

In this regard, the third example embodiment has described a case where, as an architecture, the centralized control device 3 performs centralized management on each small cell base station 1. In this case, each small cell base station 1 includes both of a digital baseband unit (BBU) which executes modulation/demodulation processing and encoding/decoding processing, and a remote radio unit (RRU) which includes an antenna and a RF (Radio Frequency) unit (in the third example embodiment illustrated in FIG. 6, both of the digital baseband unit (BBU) and the remote radio unit (RRU) are included in the base station wireless transmitting/receiving unit 10). However, the architecture is not limited to such a case.

For example, the architecture may employ a C-RAN (Centralized Radio Access Network) configuration. In case of the C-RAN configuration, the digital baseband unit (BBU) and the remote radio unit (RRU) in each small cell base station 1 can be separated and connected by using a fronthaul of high-speed optical fibers. Units subsequent to a plurality of digital baseband units (BBU) may be collectively disposed in the centralized control device 3. In case of such a configuration, the remote radio unit (RRU) corresponds to the small cell base station 1 (i.e., the remote radio units (RRU) correspond to different small cells). According to this configuration, it is possible to perform coordinated transmission/reception processing between a plurality of remote radio units (RRU) at a high speed. Consequently, it is possible to further improve frequency use efficiency, and concentration of calculation resources of each small cell base station 1 also makes it possible to improve use efficiency of the calculation resources.

Further, according to the C-RAN configuration, it is possible to measure new radio quality of other cells. As described above, it is possible to coordinate a plurality of remote radio units (RRU) and consequently apply known techniques such as coordinated multipoint (CoMP). Unlike the above cases where each mobile station 2 cannot simultaneously connect to an own cell and other cells and cannot measure the other cells, for example, each mobile station 2 can connect to the own cell and measure channel state information (CSI) of other surrounding cells by applying the coordinated multipoint technique.

When another cell (e.g., the cell of the small cell base station 1-2 illustrated in FIG. 1) forms a transmission beam in coordination with the own cell (e.g., the cell of the small cell base station 1-1 illustrated in FIG. 1) as in the third example embodiment, it is necessary to obtain measurement information of the other cells from the mobile station 2 connected to the own cell. Hence, in the third example embodiment, transmission beams of other cells are formed by using position information which can be measured without connecting to the other cells. However, when the C-RAN configuration is employed, it is possible to obtain channel state information (CSI) of the other cells as the measurement information of the other cells from the mobile station 2 connected to the own cell. Consequently, the other cells can form the transmission beams by using the obtained channel state information (CSI) as channel information. When such channel information is used, it is possible to form transmission beams by using a method such as a matched filter in addition to a steering vector method.

In this addition, in case of the C-RAN configuration, it is possible to obtain the channel state information (CSI) as radio quality of other cells. Consequently, in step S102 or S103 in the flowchart of FIG. 7, the mobile station 2 satisfying the condition may be selected by using the channel state information (CSI) instead of the received power RSRP. In this regard, the channel state information (CSI) is, for example, a CQI (Channel Quality Indicator) obtained by quantizing a SINR (Signal to Interference plus Noise Ratio) which is a received signal power to interference plus a noise to power ratio.

<Other Example Embodiment According to Present Invention>

The above first example embodiment to third example embodiment have described the cases where an arrival angle of an uplink reference signal is used to perform coverage control by a steering vector method. Angle information according to the present invention is not limited to this. For example, each mobile station 2 may create the angle information as radio quality information of each angle of a downlink reference signal, and use a precoding matrix indicator (PMI) to be reported to the small cell base station 1. An arrival angle of an uplink reference signal is suitable to the TDD (Time Division Duplex) mode which uses the same frequency in both of downlink and uplink. By contrast with this, the precoding matrix indicator (PMI) causes feedback delay from the small cell base station 1 to the mobile station 2 yet is applicable not only to the TDD mode but also to a FDD (Frequency Division Duplex) mode which uses different frequencies in downlink and uplink.

Further, the above first example embodiment to third example embodiment have described the cases where the present invention is applied to the wireless communication system of the LTE mode. However, the wireless communication method to which the present invention is applied is not limited to a specific method. For example, the present invention may be applied to a UMTS (Universal Mobile Telecommunications System) mode which is a communication method prior to the LTE mode. Alternatively, the present invention is applicable to a wireless communication system which employs the FDD mode which simultaneously uses different frequencies in uplink and downlink, and a different wireless communication system, too, (e.g., Wi-Fi (Wireless Fidelity), WiMAX (Worldwide Interoperability for Microwave Access) and IEEE 802.16m) which employs the TDD mode.

Further, in the above first example embodiment to third example embodiment, accommodation candidate cells are selected under a condition that the received power RSRP is higher than the preset received power threshold Rth1, and then an accommodation candidate cell which balances loads of the own cell and the accommodation candidate cell is determined as an unloading destination accommodation candidate cell among the selected accommodation candidate cells. However, a determination order may be reversed. That is, the accommodation candidate cells which balance the loads of the own cell and the accommodation candidate cell may be first extracted, and then the unloading destination accommodation candidate cell may be determined among the extracted accommodation candidate cells under a condition that the received RSRP is higher than the preset received power threshold Rth1.

Further, the above first example embodiment to third example embodiment have described the cases where the received power RSRP of the accommodation candidate cell is used to select an accommodation candidate cell and a continuously accommodated mobile station. The present invention is not limited to this. For example, an arrival angle of an uplink reference signal from a continuously accommodated mobile station used to determine a direction of directivity of a transmission beam may be used instead of the received power RSRP. In this case, the arrival angle threshold may be replaced with various thresholds (Rth1 and R_dif) related to the received power RSRP and an arrival angle may be used to select an accommodation candidate cell and a continuously accommodated mobile station similar to the above first example embodiment to third example embodiment. In this regard, a selection result may be combined with a selection result in case where the received power RSRP of the accommodation candidate cell is used or one of these selection results may be used.

Further, the above first example embodiment to third example embodiment assume that a small cell is overlaid on a macrocell.

However, an inter-cell installation relationship is not limited to this. For example, according to such a relationship, a small cell may not be overlaid on a macrocell and the small cell may cover an area outside a coverage of the macrocell.

<Supplementary Note>

As is clear from the above detailed description of each example embodiment of the present invention, part or all of each of the above example embodiments can also be described as in the following supplementary notes. However, naturally, the present invention is not limited to such a case.

<Supplementary Note 1>

A coverage control method of a wireless communication system that includes: a first cell; at least one second cell whose coverage at least partially overlaps the first cell; and at least one mobile station that is communicating in the first cell, wherein the coverage control method including:

a load detecting step of, at a side of the first cell, detecting that a load of the first cell is higher than a preset first load threshold;

an accommodation candidate cell selecting step of, at a side of the first cell, selecting an accommodation candidate cell from the at least one second cell based on a preset load condition, the accommodation candidate cell being a candidate to which the at least one mobile station accommodated in the first cell is unloaded, and the preset load condition being related to a coverage target communication load that is a coverage control execution target;

a continuously accommodated mobile station selecting step of, at a side of the first cell, selecting a continuously accommodated mobile station from the at least one mobile station accommodated in the first cell based on radio quality of the selected accommodation candidate cell, the continuously accommodated mobile station continuing to be a coverage control target of the first cell; and a coverage controlling step of, at a side of the first cell, performing the coverage control of the first cell by targeting at the selected continuously accommodated mobile station.

<Supplementary Note 2>

According to the coverage control method according to the supplementary note 1, the coverage target communication load is a total value of a load of the at least one mobile station satisfying a condition that the radio quality of the accommodation candidate cell is higher than a preset first quality threshold, the at least one mobile station being accommodated in the first cell.

<Supplementary Note 3>

According to the coverage control method according to the supplementary note 2, in the accommodation candidate cell selecting step, the at least one second cell whose total value satisfies the load condition is selected as the accommodation candidate cell.

<Supplementary Note 4>

According to the coverage control method according to the supplementary note 2 or 3, in the continuously accommodated mobile station selecting step, the at least one mobile station is selected as the continuously accommodated mobile station, the at least one mobile station having the radio quality of the accommodation candidate cell equal to or less than the first quality threshold.

<Supplementary Note 5>

According to the coverage control method according to the supplementary note 2 or 3, in the continuously accommodated mobile station selecting step, the mobile station is selected as the continuously accommodated mobile station, the mobile station having the radio quality of the accommodation candidate cell equal to or less than the first quality threshold or having the radio quality whose difference from the radio quality of the mobile station at a next order when the mobile station is arranged in a descending order of the radio quality of the accommodation candidate cell in the accommodation candidate cell is equal to or less than a second quality threshold.

<Supplementary Note 6>

According to the coverage control method according to the supplementary note 2 or 3, in the continuously accommodated mobile station selecting step, the at least one mobile station is selected as the continuously accommodated mobile station, the at least one mobile station having the radio quality whose relative value of the radio quality of the accommodation candidate cell with respect to the radio quality of the first cell is equal to or less than a preset third quality threshold.

<Supplementary Note 7>

According to the coverage control method according to the supplementary note 1, in the accommodation candidate cell selecting step, one of following operatins is performed, the following operations being an operation of extracting the accommodation candidate cell satisfying a condition that the radio quality is higher than a preset first quality threshold, and then selecting the accommodation candidate cell satisfying the load condition that a difference between a load of the first cell and a load of the accommodation candidate cell is predicted to be smaller after the unloading than before the unloading from the extracted accommodation candidate cell, and, an operation of extracting the accommodation candidate cell satisfying the load condition that the difference between the load of the first cell and the load of the accommodation candidate cell is predicted to be smaller after the unloading than before the unloading and then selecting the accommodation candidate cell satisfying a condition that the radio quality is higher than the preset first quality threshold from the extracted accommodation candidate cell, an operation of extracting the accommodation candidate cell satisfying the condition that the radio quality is higher than the preset first quality threshold, and then selecting the accommodation candidate cell satisfying the load condition that a total value of a load predicted to be unloaded to the accommodation candidate cell is maximum and the difference between the load of the first cell and the load of the accommodation candidate cell is predicted to be smaller after the unloading than before the unloading from the extracted accommodation candidate, and, an operation of extracting the accommodation candidate cell satisfying the load condition that the difference between the load of the first cell and the load of the accommodation candidate cell is predicted to be smaller after the unloading than before the unloading, narrowing the extracted accommodation candidate cell to the accommodation candidate cell satisfying a condition that the radio quality of the accommodation candidate cell is higher than the preset first quality threshold in order of the higher radio quality, and then selecting the accommodation candidate cell taking a maximum total value of loads predicted to be unloaded to the accommodation candidate cell from the narrowed accommodation candidate cell, an operation of extracting the accommodation candidate cell satisfying both of a condition that, when the accommodation candidate cell is arranged in a descending order of the radio quality, a difference from the radio quality of the accommodation candidate cell positioned at a next order is higher than a preset second quality threshold and a condition that the radio quality of the accommodation candidate cell is higher than the preset first quality threshold, and then selecting the accommodation candidate cell satisfying the load condition that the total value of the loads predicted to be unloaded to the accommodation candidate cell is maximum and the difference between the load of the first cell and the load of the accommodation candidate cell is predicted to be smaller after the unloading than before the unloading from the extracted accommodation candidate cell, the accommodation candidate cell, and an operation of extracting the accommodation candidate cell satisfying the load condition that the difference between the load of the first cell and the load of the accommodation candidate cell is predicted to be smaller after the unloading than before the unloading, then narrowing the extracted accommodation candidate cell to the accommodation candidate cell satisfying both of the condition that, when the radio quality of the accommodation candidate cell is arranged in the descending order, the difference from the radio quality of the accommodation candidate cell positioned at the next order is higher than the preset second quality threshold and the condition that the radio quality of the accommodation candidate cell is higher than the preset first quality threshold, and selecting the accommodation candidate cell taking the maximum total value of the loads to be predicted to be unloaded to the accommodation candidate cell from the narrowed accommodation candidate cell.

<Supplementary Note 8>

According to the coverage control method according to any one of the supplementary notes 2 to 6, the load condition is a condition that the total value is one of a maximum value and a value equal to or more than a preset second load threshold and, when the unloading is performed, a difference between a load of the first cell and a load of the accommodation candidate cell is predicted to be smaller than before the unloading.

<Supplementary Note 9>

According to the coverage control method according to any one of the supplementary notes 2 to 6, the load condition is a condition that the total value is one of a maximum value and a value equal to or more than a preset second load threshold, and, when the unloading is performed, a load of the accommodation candidate cell is predicted to be less than a preset upper limit value.

<Supplementary Note 10>

According to the coverage control method according to any one of the supplementary notes 2 to 6, the load condition is a condition that the total value is one of a maximum value and a value equal to or more than a preset second load threshold, and, when the unloading is performed, the load of the first cell is predicted to be a preset lower limit value or more.

<Supplementary Note 11>

According to the coverage control method according to any one of the supplementary notes 1 to 10, in the coverage controlling step, directivity of a transmission beam of the first cell is controlled in at least one direction of a horizontal direction and a vertical direction for a direction of the continuously accommodated mobile station.

<Supplementary Note 12>

According to the coverage control method according to any one of the supplementary notes 1 to 10, in the coverage controlling step, directivity of a transmission beam of the first cell is controlled in one direction of a direction calculated based on an arrival angle of an uplink reference signal from the continuously accommodated mobile station, a direction calculated based on pre-encoding weight information for reporting a measurement result of radio quality per angle of a downlink signal from the continuously accommodated mobile station, and a direction calculated based on channel information between transmission and reception antennas.

<Supplementary Note 13>

The coverage control method according to any one of the supplementary notes 1 to 12 further includes:

a non-accommodation mobile station selecting step of, at a side of the first cell, selecting the mobile station other than the continuously accommodated mobile station as a non-accommodation mobile station to be unloaded to the accommodation candidate cell;

a coverage control information notifying step of, at a side of the first cell, notifying the accommodation candidate cell of information for controlling a coverage of the accommodation candidate cell by targeting at the selected non-accommodation mobile station; and an accommodation candidate cell coverage controlling step of, at a side of the accommodation candidate cell, performing the coverage control by targeting at the mobile station and the non-accommodation mobile station that have already been accommodated in the accommodation candidate cell based on the information notified in the coverage control information notifying step.

<Supplementary Note 14>

According to the coverage control method according to the supplementary note 13, in the accommodation candidate coverage controlling step, the coverage control of the first cell performed in the coverage controlling step triggers coverage control with respect to the accommodation candidate cell based on one of position information related to the non-accommodation mobile station and channel information of the non-accommodation mobile station in the accommodation candidate cell.

<Supplementary Note 15>

According to the coverage control method according to any one of the supplementary notes 1 to 14, the radio quality is one of received power of a downlink reference signal, received quality RSRQ (Reference Signal Received Quality) of the downlink reference signal, a received signal power to interference plus noise to power ratio, channel state information, and an arrival angle of an uplink reference signal.

<Supplementary Note 16>

According to the coverage control method according to the supplementary note 1, the coverage target communication load is a load of the second cell.

<Supplementary Note 17>

According to the coverage control method according to the supplementary note 16, in the accommodation candidate cell selecting step, the second cell whose load satisfies a preset second cell load condition is selected as the accommodation candidate cell.

<Supplementary Note 18>

According to the coverage control method according to the supplementary note 17, the second cell load condition is a condition that the load of the own cell of the second cell before the unloading is one of a minimum value and a value less than a preset second cell load threshold.

<Supplementary Note 19>

According to the coverage control method according to any one of the supplementary notes 1 to 18, the load of one of the first cell, the second cell, the accommodation candidate cell and the mobile station is one of a transmission buffer size, a number of the communicating mobile stations and a resource usage of a frequency resource.

<Supplementary Note 20>

According to the coverage control method according to any one of the supplementary notes 1 to 19, the mobile station measures radio quality of another cell whose coverage partially overlaps an own cell in which the mobile station is accommodated, and reports information related to the measured radio quality of the another cell to the own cell based on a report condition specified in advance in the own cell.

<Supplementary Note 21>

According to the coverage control method according to the supplementary note 20, the report condition is one of a condition for reporting the information related to the measured radio quality of the another cell with identification information for specifying the another cell at a preset cycle on a regular basis, and, a condition for, when detecting the radio quality of the another cell that takes a higher value than a quality threshold set in advance, reporting the information related to the detected radio quality of the another cell with the identification information for specifying the another cell.

<Supplementary Note 22>

A base station apparatus in a wireless communication system that includes: a first cell; at least one second cell whose coverage at least partially overlaps the first cell; and at least one mobile station that is communicating in the first cell, and the base station apparatus that forms the first cell includes:

load detecting unit for detecting that a load of the first cell is higher than a preset first load threshold;

accommodation candidate cell selecting unit for selecting an accommodation candidate cell from the at least one second cell based on a preset load condition, the accommodation candidate cell being a candidate to which the mobile station accommodated in the first cell is unloaded, and the preset load condition being related to a coverage target communication load that is a coverage control execution target;

continuously accommodated mobile station selecting unit for selecting a continuously accommodated mobile station from the at least one mobile station accommodated in the first cell based on radio quality of the selected accommodation candidate cell, the continuously accommodated mobile station continuing to be a coverage control target of the first cell; and coverage controlling unit for performing the coverage control of the first cell by targeting at the selected continuously accommodated mobile station.

<Supplementary Note 23>

In the base station apparatus according to the supplementary note 22, the base station apparatus that forms the first cell further includes connecting unit for connecting with another base station apparatus that forms the second cell via one of a wired line and a wireless line.

<Supplementary Note 24>

In the base station apparatus according to the supplementary note 22 or 23, the coverage target communication load is one of a total value of a load of the at least one mobile station satisfying a condition that the radio quality of the accommodation candidate cell is higher than a preset first quality threshold, the at least one mobile station being accommodated in the first cell, and a load of the second cell.

<Supplementary Note 25>

In the base station apparatus according to the supplementary note 24, the accommodation candidate cell selecting unit selects as the accommodation candidate cell the at least one second cell taking the total value satisfying the load condition or selects as the accommodation candidate cell the at least one second cell having a load of the second cell satisfying a preset second load condition.

<Supplementary Note 26>

In the base station apparatus according to the supplementary note 24 or 25, the continuously accommodated mobile station selecting unit selects as the continuously accommodated mobile station the mobile station having the radio quality of the accommodation candidate cell equal to or less than the first quality threshold or less, selects the mobile station as the continuously accommodated mobile station, the mobile station having the radio quality of the accommodation candidate cell equal to or less than the first quality threshold, or having the radio quality whose difference from the radio quality of the accommodation candidate cell in the mobile station positioned at a next order when the mobile station is arranged in a descending order of the radio quality of the accommodation candidate cell is a second quality threshold or less, or selects the mobile station as the continuously accommodated mobile station, the mobile station taking a relative value of the radio quality of the accommodation candidate cell with respect the radio quality of the first cell equal to or less than a preset third quality threshold.

<Supplementary Note 27>

In the base station apparatus according to any one of the supplementary notes 24 to 26, the load condition is one of a condition that the total value is one of a maximum value and a value equal to or more than a preset second load threshold, and, when the unloading is performed, a difference between a load of the first cell and a load of the accommodation candidate cell is predicted to be smaller than before the unloading, a condition that the total value is one of the maximum value and the value equal to or more than the preset second load threshold, and, when the unloading is performed, a load of the accommodation candidate cell is predicted to be less than a preset upper limit value, and a condition that the total value is one of the maximum value and the value equal to or more than the preset second load threshold, and, when the unloading is performed, the load of the first cell is predicted to be equal to or more than a preset lower limit value.

<Supplementary Note 28>

In the base station apparatus according to any one of the supplementary notes 22 to 27, the coverage controlling unit controls directivity of a transmission beam of the first cell in at least one direction of a horizontal direction and a vertical direction for a direction of a continuously accommodated mobile station or controls the directivity of the transmission beam of the first cell to one direction of a direction calculated based on an arrival angle of an uplink reference signal from the continuously accommodated mobile station, a direction calculated based on pre-encoding weight information for reporting a measurement result of radio quality per angle of a downlink signal from the continuously accommodated mobile station, and a direction calculated based on channel information between transmission and reception antennas.

<Supplementary Note 29>

A wireless communication system includes:

a base station apparatus that forms a first cell;

at least another base station apparatus that forms a second cell whose coverage partially overlaps the first cell; and at least one mobile station that is communicating in the first cell, and the base station apparatus that forms the first cell includes:

load detecting unit for detecting that a load of the first cell is higher than a preset first load threshold;

accommodation candidate cell selecting unit for selecting an accommodation candidate cell from the at least one second cell based on a preset load condition, the accommodation candidate cell being a candidate to which the at least one mobile station accommodated in the first cell is unloaded, and the preset load condition being related to a coverage target communication load that is a coverage control execution target;

continuously accommodated mobile station selecting unit for selecting a continuously accommodated mobile station from the at least one mobile station accommodated in the first cell based on radio quality of the selected accommodation candidate cell, the continuously accommodated mobile station continuing to be a coverage control target of the first cell; and coverage controlling unit for performing the coverage control of the first cell by targeting at the selected continuously accommodated mobile station.

<Supplementary Note 30>

In the wireless communication system according to the supplementary note 29, the base station apparatus that forms the first cell further includes:

non-accommodation mobile station selecting unit for selecting the mobile station other than the continuously accommodated mobile station as a non-accommodation mobile station to be unloaded to the accommodation candidate cell; and coverage control information notifying unit for notifying the accommodation candidate cell of information for controlling a coverage of the accommodation candidate cell by targeting at the selected non-accommodation mobile station, and the base station apparatus that forms the second cell corresponding to the accommodation candidate cell includes accommodation candidate cell coverage controlling unit for performing coverage control by targeting at the mobile station and the non-accommodation mobile station that have already been accommodated in the accommodation candidate cell, based on the information notified by the coverage control information notifying unit of the base station apparatus that forms the first cell.

<Supplementary Note 31>

In the wireless communication system according to the supplementary note 30, the coverage control of the first cell performed by the coverage control unit of the base station apparatus that forms the first cell triggers, in the accommodation candidate coverage controlling unit, coverage control with respect to the accommodation candidate cell based on one of position information related to the non-accommodation mobile station and channel information of the non-accommodation mobile station in the accommodation candidate cell.

<Supplementary Note 32>

The wireless communication system according to any one of the supplementary notes 29 to 31 further includes a centralized control device that performs centralized management on the base station apparatus that forms the first cell and the base station apparatus that forms the second cell, and the centralized control device is connected with the base station apparatus that forms the first cell and the base station apparatus that forms the second cell via one of a wired line and a wireless line.

<Supplementary Note 33>

In the wireless communication system according to the supplementary note 32, an architecture employs a C-RAN (Centralized Radio Access Network) configuration in which a digital baseband unit (BBU) and a remote radio unit (RRU) in each of the base station apparatuses are separated, the digital baseband unit and the remote radio unit are connected by using a high-speed optical fiber, and one or a plurality of the digital baseband units are collectively disposed in the centralized control device, <Supplementary Note 34>

In the wireless communication system according to the supplementary note 33, the mobile station connects to an own cell and obtains channel state information of other surrounding cell by coordinating a plurality of the remote radio units.

<Supplementary Note 35>

In the wireless communication system according to any one of the supplementary notes 29 to 34, the first cell and the second cell employ as a wireless communication method one of a LTE (Long Term Evolution) mode, a UMTS (Universal Mobile Telecommunications System) mode, a FDD mode, a Wi-Fi (Wireless Fidelity) mode, a WiMAX (Worldwide Interoperability for Microwave Access) mode, and a mode that complies with IEEE 802.16m standards.

<Supplementary Note 36>

In the wireless communication system according to any one of the supplementary notes 29 to 35, both of the first cell and the second cell are small cells, and the small cells are overlaid on a macrocell or cover an area that is an outside of a coverage of the macrocell.

<Supplementary Note 37>

A base station control program that is executed by a computer in a base station apparatus that forms a first cell to control an operation of the base station apparatus in a wireless communication system that includes: the base station apparatus that forms the first cell; at least another base station apparatus that forms a second cell whose coverage partially overlaps the first cell; and at least one mobile station that is communicating in the first cell, and includes:

load detection processing of detecting that a load of the first cell is higher than a preset first load threshold;

accommodation candidate cell selection processing of selecting an accommodation candidate cell from the second cell based on a preset load condition, the accommodation candidate cell being a candidate to which the mobile station accommodated in the first cell is unloaded, and the preset load condition being related to a coverage target communication load that is a coverage control execution target;

continuously accommodated mobile station selection processing of selecting a continuously accommodated mobile station from the mobile station accommodated in the first cell based on radio quality of the selected accommodation candidate cell, the continuously accommodated mobile station continuing to be a coverage control target of the first cell; and coverage control processing of performing the coverage control of the first cell by targeting at the selected continuously accommodated mobile station.

INDUSTRIAL APPLICABILITY

A typical application example of the present invention is a cell coverage controlling function performed in heterogeneous network environment in which cells of difference sizes and frequencies coexist in a mixed manner in mobile communication. Controlling a coverage of a small size cell to an area in which mobile stations are located is particularly effective to effectively increase a network capacity.

The configurations of the preferred example embodiments of the present invention have been described. However, it should be borne in mind that the above example embodiments are simply exemplary embodiments of the present invention and by no means limit the present invention. The example embodiments can be variously modified and changed according to specific use without departing from the scope of the present invention.

Further, the present invention has been described as a hardware configuration in the above example embodiments. However, the present invention is not limited to this. The present invention can also realize arbitrary processing by causing a CPU (Central Processing Unit) to execute a computer program. Further, the above program can be stored by using various types of non-transitory computer readable media, and be supplied to a computer. The non-transitory computer readable media include various types of tangible storage media. The non-transitory computer readable media include, for example, magnetic recording media (e.g., flexible disks, magnetic tapes and hard disk drives), magnetooptical recording media (e.g., optical magnetic disks), CD-ROMs (Read Only Memory), CD-Rs, CD-R/Ws and semiconductor memories (e.g., mask ROMs, PROMs (Programmable ROM), EPROMs (Erasable PROM), flash ROMs and RAMs (Random Access Memory)). Further, the programs may be supplied to the computers by various types of transitory computer readable media. The transitory computer readable media include, for example, electrical signals, optical signals and electromagnetic waves. The transitory computer readable media can supply the programs to the computers via wired communication channels such as electrical cables or optical wires or wireless communication channels.

This application claims priority to Japanese Patent Application No. 2015-044829 filed on Mar. 6, 2015, the entire contents of which are incorporated by reference herein.

REFERENCE SIGNS LIST

1 SMALL CELL BASE STATION
1-1 SMALL CELL BASE STATION
1-2 SMALL CELL BASE STATION
1-3 SMALL CELL BASE STATION
2 MOBILE STATION
2-1A NON-ACCOMMODATION MOBILE STATION
2-1a MOBILE STATION
2-1B CONTINUOUSLY-ACCOMMODATED MOBILE STATION
2-1b MOBILE STATION
2-1c MOBILE STATION
2-1d MOBILE STATION
2-1e MOBILE STATION
2-1f MOBILE STATION
2-1g MOBILE STATION
2-1h MOBILE STATION
2-2a MOBILE STATION
2-2b MOBILE STATION
2-3 MOBILE STATION
3 CENTRALIZED CONTROL DEVICE
10 BASE STATION WIRELESS TRANSMITTING/RECEIVING UNIT
11 TRANSMISSION/RECEPTION BUFFER UNIT
12 LOAD MEASURING UNIT
13 UNLOAD CONTROL UNIT
14 RADIO PARAMETER CONTROL UNIT
20 MOBILE STATION WIRELESS TRANSMITTING/RECEIVING UNIT
21 RADIO QUALITY MEASURING UNIT

What is claimed is:

1. A coverage control method of a wireless communication system that includes: a first cell; at least one second cell whose coverage at least partially overlaps the first cell; and at least one mobile station that is communicating in the first cell, wherein the coverage control method including:
  detecting, at a side of the first cell, that a load of the first cell is higher than a preset first load threshold;
  selecting as a first selecting, at a side of the first cell, an accommodation candidate cell from the at least one second cell based on a preset load condition, the selected accommodation candidate cell being a candidate to which the at least one mobile station accommodated in the first cell is unloaded, and the preset load condition being related to a coverage target communication load that is a coverage control execution target;
  selecting as a second selecting, at a side of the first cell, a continuously accommodated mobile station from the at least one mobile station accommodated in the first cell based on radio quality of the selected accommodation candidate cell, the continuously accommodated mobile station continuing to be a coverage control target of the first cell; and
  performing as a first performing, at a side of the first cell, the coverage control of the first cell by targeting at the selected continuously accommodated mobile station,
  wherein the coverage target communication load is a total value of a load of the at least one mobile station satisfying a condition that the radio quality of the accommodation candidate cell is higher than a preset first quality threshold, the at least one mobile station being accommodated in the first cell, and
  wherein the first selecting includes: selecting as the accommodation candidate cell the at least one second cell taking the total value satisfying the load condition.

2. The coverage control method according to claim 1, wherein
  the second selecting includes:
  selecting as the continuously accommodated mobile station the mobile station having the radio quality of the accommodation candidate cell equal to or less than the first quality threshold or less,
  selecting the mobile station as the continuously accommodated mobile station, the selected mobile station having the radio quality of the accommodation candidate cell equal to or less than the first quality threshold, or having the radio quality whose difference from the radio quality of the accommodation candidate cell in the mobile station positioned at a next order when the mobile station is arranged in a descending order of the radio quality of the accommodation candidate cell is a second quality threshold or less, or selecting the mobile station as the continuously accommodated mobile station, the selected mobile station taking a relative value of the radio quality of the accommodation candidate cell with respect the radio quality of the first cell equal to or less than a preset third quality threshold.

3. The coverage control method according to claim 1, wherein
the load condition is one of
a condition that the total value is one of a maximum value and a value equal to or more than a preset second load threshold, and, when the unloading is performed, a difference between a load of the first cell and a load of the accommodation candidate cell is predicted to be smaller than before the unloading,
a condition that the total value is one of the maximum value and the value equal to or more than the preset second load threshold, and, when the unloading is performed, a load of the accommodation candidate cell is predicted to be less than a preset upper limit value, and
a condition that the total value is one of the maximum value and the value equal to or more than the preset second load threshold, and, when the unloading is performed, the load of the first cell is predicted to be equal to or more than a preset lower limit value.

4. The coverage control method according to claim 1, wherein
the first performing includes:
controlling directivity of a transmission beam of the first cell in at least one direction of a horizontal direction and a vertical direction for a direction of a continuously accommodated mobile station, or
controlling the directivity of the transmission beam of the first cell to one direction of a direction calculated based on an arrival angle of an uplink reference signal from the continuously accommodated mobile station, a direction calculated based on pre-encoding weight information for reporting a measurement result of radio quality per angle of a downlink signal from the continuously accommodated mobile station, and a direction calculated based on channel information between transmission and reception antennas.

5. The coverage control method according to claim 1 further including:
selecting as a third selecting, at a side of the first cell, the mobile station other than the continuously accommodated mobile station as a non-accommodation mobile station to be unloaded to the accommodation candidate cell;
notifying, at a side of the first cell, the accommodation candidate cell of information for controlling a coverage of the accommodation candidate cell by targeting at the selected non-accommodation mobile station; and
performing as a second performing, at a side of the accommodation candidate cell, the coverage control by targeting at the mobile station and the non-accommodation mobile station that have already been accommodated in the accommodation candidate cell based on the information notified in the notifying.

6. The coverage control method according to claim 1, wherein the load of the mobile station is one of a transmission buffer size, a number of the communicating mobile stations and a resource utilization of a frequency resource.

7. A base station apparatus in a wireless communication system that includes: a first cell; at least one second cell whose coverage at least partially overlaps the first cell; and at least one mobile station that is communicating in the first cell, wherein the base station apparatus that forms the first cell includes:
hardware, including a processor and a memory;
a load detecting unit that is implemented at least by the hardware and that detects that a load of the first cell is higher than a preset first load threshold;
an accommodation candidate cell selecting unit that is implemented at least by the hardware and that selects an accommodation candidate cell from the at least one second cell based on a preset load condition, the selected accommodation candidate cell being a candidate to which the mobile station accommodated in the first cell is unloaded, and the preset load condition being related to a coverage target communication load that is a coverage control execution target;
a continuously accommodated mobile station selecting unit that is implemented at least by the hardware and that selects a continuously accommodated mobile station from the at least one mobile station accommodated in the first cell based on radio quality of the selected accommodation candidate cell, the continuously accommodated mobile station continuing to be a coverage control target of the first cell; and
a coverage controlling unit that is implemented at least by the hardware and that performs the coverage control of the first cell by targeting at the selected continuously accommodated mobile station,
wherein the coverage target communication load is a total value of a load of the at least one mobile station satisfying a condition that the radio quality of the accommodation candidate cell is higher than a preset first quality threshold, the at least one mobile station being accommodated in the first cell, and
wherein the accommodation candidate cell selecting unit selects as the accommodation candidate cell the at least one second cell taking the total value satisfying the load condition.

8. A non-transitory computer readable medium storing a base station control program that is executed by a computer in a base station apparatus that forms a first cell to control an operation of the base station apparatus in a wireless communication system that includes: the base station apparatus that forms the first cell; at least another base station apparatus that forms a second cell whose coverage partially overlaps the first cell; and at least one mobile station that is communicating in the first cell, wherein the operation includes:
load detection processing of detecting that a load of the first cell is higher than a preset first load threshold;
accommodation candidate cell selection processing of selecting an accommodation candidate cell from the second cell based on a preset load condition, the accommodation candidate cell being a candidate to which the mobile station accommodated in the first cell is unloaded, and the preset load condition being related to a coverage target communication load that is a coverage control execution target;
continuously accommodated mobile station selection processing of selecting a continuously accommodated mobile station from the mobile station accommodated in the first cell based on radio quality of the selected accommodation candidate cell, the continuously accommodated mobile station continuing to be a coverage control target of the first cell; and coverage control processing of performing the coverage control of the first cell by targeting at the selected continuously accommodated mobile station, wherein the coverage target communication load is a total value of a load of the at least one mobile station satisfying a condition that the radio quality of the accommodation candidate cell is higher than a preset first quality threshold, the at least one mobile station being accommodated in the first cell, and wherein the accommodation candidate cell selection processing selects as the accommodation candidate cell the at least one second cell taking the total value satisfying the load condition.

* * * * *